United States Patent [19]
Ohishi et al.

[11] Patent Number: 5,926,153
[45] Date of Patent: *Jul. 20, 1999

[54] MULTI-DISPLAY APPARATUS

[75] Inventors: Tetsu Ohishi, Hiratsuka; Takahiko Yoshida, Miura; Hiroki Yoshikawa, Hiratsuka; Yutaka Matsuda, Fujisawa; Hideo Tanide, Yokohama; Shigeru Mori, Chigasaki; Atsuo Osawa, Yokohama; Koji Hirata, Kamakura, all of Japan

[73] Assignee: Hitachi, Ltd., Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/592,177

[22] Filed: Jan. 26, 1996

[30] Foreign Application Priority Data

Jan. 30, 1995 [JP] Japan ..................................... 7-012826
Jun. 16, 1995 [JP] Japan ..................................... 7-150367

[51] Int. Cl.$^6$ ..................................................... B09G 5/00
[52] U.S. Cl. ................................... 345/1; 434/44; 348/36
[58] Field of Search .................................... 348/36; 345/1, 345/7, 8, 9, 2; 434/38, 40, 44

[56] References Cited

U.S. PATENT DOCUMENTS

| | | | |
|---|---|---|---|
| 4,473,355 | 9/1984 | Pongratz | 434/44 |
| 4,656,506 | 4/1987 | Ritchey | 434/44 |
| 5,130,794 | 7/1992 | Ritchey | 348/383 |
| 5,582,518 | 12/1996 | Henique et al. | 434/44 |

*Primary Examiner*—Dennis-Doon Chow
*Attorney, Agent, or Firm*—Antonelli, Terry, Stout & Kraus, LLP

[57] ABSTRACT

A multi-display apparatus includes a plurality of rear projection-type display devices each in which projection light from image sources is projected through projection lenses onto a rear projection surface of a rear projection screen to form a picture image on a front viewing surface of the rear projection screen, the plurality of rear projection-type display devices being combined together in contiguous relation to one another to form a large screen. An overall front viewing surface of the large screen is formed into a concave surface curved both in a horizontal visibility angle direction and a vertical visibility angle direction. A light-absorbing portion is formed on the front viewing surface of the rear projection screen, and the light-absorbing portion absorbs projection light which passes through one rear projection screen, and is incident as external light on another rear projection screen, thereby preventing a picture image from being degraded.

23 Claims, 36 Drawing Sheets

MULTI-DISPLAY APPARATUS

BACKGROUND OF THE INVENTION

This invention relates to a rear projection-type multi-display apparatus in which a plurality of rear projection-type multi-display devices are arranged in contiguous relation to one another to form a large screen, and more particularly to a rear projection-type multi-display apparatus in which the screen is curved in a three-dimensional manner.

Recently, a display system, used in a play apparatus in an amusement park, a training apparatus such as a drive simulator and a flight simulator and so on, has now been required to provide a simulation space which makes the viewer feel as if he were in the scene in the picture image so that the viewer can perceive the realism, thereby enhancing the quality of the play and the degree of the training. In such a display system, what is to be perceived by the viewer through the sense of sight, the sense of hearing and so on are given to the viewer through the picture image, sound, the sense of acceleration and etc. In this case, the perception effect by the picture image is the most effective though there is the difference from one viewer to another, and therefore the image with a wider angle of visibility gives the more appealing realism.

For achieving such an image with a wide visibility angle, there has existed a front projection-type, dome-shaped display device in which an image is projected from the viewer side onto a dome-shaped reflecting screen provided in overhanging relation to the viewer.

FIG. 30 is a schematic, vertical cross-sectional view of such a front projection-type, dome-shaped display device as disclosed in U.S. Pat. No. 5,433,670. In this Figure, an image projected from a front projection device (projector) 90 is reflected by a reflecting screen 91, and reaches the viewer seated on a viewer's seat 23. In the front projection device 90, an image, displayed on a projection-type CRT (cathode ray tube), a liquid crystal display (which serve as a small image-generating source) or a film, is magnified by a fisheye-type projection lens, and is projected on the dome-shaped reflecting screen 91. Although the front projection device 90 is located above the head of the viewer in the illustrated example, it can be located at one side of the viewer, at the foot of the viewer, or at any other suitable position.

As a simpler system which can provide an improved picture quality, and can easily provide a large screen, there have now been increasingly used display devices (e.g. a rear projection-type television) for business purposes, in which an image, displayed on a projection-type CRT or a liquid crystal display serving as a small image-generating source, is magnified by projection lenses, and is projected on a rear projection screen or transmission screen.

In such a rear projection-type display device, where a projection-type CRT has been used as the image-generating source, there has heretofore been used a system in which in order to make the brightness on the transmission screen sufficiently high and also to maintain the fineness of the image, the projection-type CRT and the projection lens have been used for each of three primary colors (red, green and blue), and these three color images are combined together on the rear projection screen. FIG. 31 is a transverse cross-sectional view showing an optical system of an ordinary rear projection-type display device. As shown in this Figure, an image on each projection-type CRT with a diagonal size of about 5 inch is magnified 8~12 times by a projection lens 60. The three projection-type CRTs 61 to 63 are arranged or juxtaposed in an inline fashion in such a manner that the G CRT 61 is disposed between the left-side B CRT 63 and the right-side R CRT 62. Image light rays are combined together on a rear projection screen 65. Each projection-type CRT and the associated projection lens are connected together by a bracket 66.

FIG. 32 is a perspective view of an important portion of a conventional rear projection screen used in such a rear projection-type display device. As shown in this Figure, the conventional transmission screen consists of two sheets, that is, a Fresnel lens sheet 50 and a lenticular lens sheet 70. A light-incident surface 52 of the Fresnel lens sheet 50 is planar or flat while a Fresnel convex lens is formed on its light-outgoing surface 53. The Fresnel convex lens on the light-outgoing surface 53 of the Fresnel lens sheet 50 functions to convert the image light flux, incident on the light-incident surface 52, into generally parallel rays of light emerging from the light-outgoing surface 53, so that this Fresnel convex lens serves to make the brightness of the transmission screen uniform over the entire area thereof.

FIG. 33 is a transverse cross-sectional view of an important portion of the lenticular lens sheet 70. As shown in FIG. 32 and 33, the lenticular lens sheet 70 has a plurality of elongate lenticular lenses formed on its light-incident surface 71, and these elongate lenticular lenses extend in a vertical direction of the screen surface, and are juxtaposed in a consecutive manner in a horizontal direction of the screen surface. Elongate lenticular lenses and light-absorbing stripe portions 73 of a predetermined width are alternately formed on a light-outgoing surface 72 of the lenticular lens sheet 70 in a consecutive manner, these elongate lenticular lenses and these light-absorbing stripe portions extending in the vertical direction of the screen surface. Each of the lenticular lenses on the light-incident surface 71 has a generally semi-oval, transverse cross-sectional shape, and the configuration and characteristics thereof are described in detail in Japanese Patent Unexamined Publication No. 58-59436.

When viewing an image on a display device in a bright room, light in this room, which serves as external light, is reflected by a screen, and this light is seen as superposed on image light, so that the displayed image is often clearly invisible. The above-mentioned lenticular lens sheet serves to reduce the reflection of the external light in the display device.

Incident light 74, refracted by the vertically-elongate lenticular lens, is converged into a region of a predetermined width on the light-outgoing surface 72, as shown in FIG. 33. Those portions of the light-outgoing surface 72 from which the light will not go out are coated with black paint or coating to provide the light-absorbing stripes 73. By doing so, the reflection of the external light on the screen can be greatly reduced. If the area ratio of light-absorbing stripes to an overall light-outgoing surface of a conventional lenticular lens sheet is about 50%, the reflection of external light at the light-absorbing stripes is very small, and therefore can be regarded as being substantially zero, and the average reflectance of the external light at the screen surface is reduced about 50% as compared with the case where no light-absorbing stripe is provided. Therefore, if external light of the same intensity is present, the reflection intensity is reduced to a half level.

In connection with this rear projection-type display device, in order to obtain a more appealing realism, there has been proposed a rear projection-type multi-screen display apparatus in which a plurality of rear projection-type display devices are combined together vertically and horizontally so as to display a large picture image. With such a multi-screen system, a large screen, for example, with a diagonal size of 200 inch can be relatively easily provided while keeping the diagonal size of each individual rear projection-type display device to about 40 inch, and therefore the magnification of the image of the CRT by the projection lens needs only to be about 8 times, and this is advantageous from the viewpoint of brightness and fineness.

However, when it is desired to provide a picture image which gives such a realism to the viewer that he feels as if he were in the scene in the picture image, a satisfactory effect can not be achieved if the screen surface is flat or planar even though the screen has a large size, and it is necessary to provide the type of display apparatus in which the screen is disposed in generally surrounding relation to the viewer.

Therefore, in the conventional rear projection-type multi-screen display apparatus, there has been used a technique in which the individual screens are combined together in such a manner that they are inclined at an angle with respect to each other in the horizontal direction, thereby curving the overall screen in the horizontal direction.

FIG. 34 is a perspective view of one conventional rear projection-type multi-screen display apparatus having a horizontally-curved screen. In this rear projection-type multi-screen display apparatus shown in FIG. 34, rear projection-type display devices are arranged in three rows and four columns in contiguous relation to one another. Any two horizontally-adjacent rear projection-type display devices are connected together at an angle of 30 degrees in the horizontal direction. The ratio of the width to height of a transmission screen of each of the rear projection-type display devices is 4:3, and this screen has a diagonal size of 40 inch. In FIG. 34, reference numeral 3 denotes a unit support frame supporting the rear projection-type display unit containing a projection device (projector) 4, and a rectangular screen (transmission screen) 1 is supported on a screen support frame 2 mounted on a front side of the unit support frame 3. Reference numeral 8 denotes a support base on which the multi-screen display apparatus is supported.

FIG. 35 is a horizontal cross-sectional view of the rear projection-type multi-screen display apparatus shown in FIG. 34. As shown in this Figure, when the viewer 9 is spaced 1.5 m from the screen, the angle of visibility in the horizontal direction is about 120°, so that the enhanced realism can be obtained in the horizontal direction.

The above-mentioned front projection-type, dome-shaped display device of FIG. 30 could not provide a picture image, giving the enhanced realism, mainly for reasons mentioned below.

A first problem is that since the projection device is located at that side of the screen where the viewer is present, the projection device comes into the sight of the viewer while the viewer watches the picture image, so that he felt not fully absorbed in the picture image. Besides, when the diameter of the dome is not more than 4 m, it has been difficult for the viewer to take an appropriate viewing position because of interference with the projection device.

A second problem is that since it is necessary to cover a wide area by the single projection device, the magnification of the image by the projection lens need to be high, so that a relatively dark image could be provided. If the screen size of the image source is, for example, 5 inch in diagonal size, the magnification need to be 24 times for projecting an image on a screen with a diagonal size of 120 inch, and its brightness is about 1/600 of that of the image source. Although the brightness can be enhanced by increasing the number of projection devices, this invites problems that the space for installation of the projection devices increases, and that a large space is required.

A third problem is that when the magnification of the image by the projection lens is high, the fineness of the picture image is sacrificed.

On the other hand, the conventional rear projection-type multi-screen display apparatus does not suffer from the brightness and fineness problems which the front projection-type, dome-shaped display device encounters. Furthermore, in the case of the rear projection-type display device, the projection device is located on the side of the screen remote from the viewer, and therefore even if the number of projection devices is increased, no limitation is presented to the viewing position, and the projection devices will not come into sight. Therefore, the multi-screen system can be easily formed by increasing the number of projection devices. For example, let's assume that the rear projection-type display devices each having a diagonal size of 40 inch are used, a required magnification of a 5-inch screen of a projection-type CRT into a diagonal size of 40 inch is relative small, that is, 8 times, and accordingly, the brightness becomes 1/64. Thus, each individual rear projection-type display device can achieve sufficient brightness and fineness.

In the conventional rear projection-type multi-screen display apparatus, however, although the screen can be curved in either the horizontal direction or the vertical direction to widen the visibility angle, it has been impossible to curve the screen in both directions so as to widen the visibility angle in both the horizontal and vertical directions.

For example, in the rear projection-type multi-screen display apparatus shown in FIGS. 34 and 35, a sufficient visibility angle in the vertical (upward-downward) direction can not be obtained.

FIG. 36 is a vertical cross-sectional view of the above conventional rear projection-type multi-screen apparatus. When the viewer 9 is spaced 1.5 m from the screen surface, and watches the screen as shown in FIG. 36, the visibility angle in the upward direction is about 45°. However, the angle of viewing of the upper edge of the screen by the viewer with respect to a direction 80 normal to the screen is 45°, and the distortion of the image viewed by the viewer increases, so that the substantial visibility angle in the upward direction is further reduced.

The rear projection-type display device weighs 50~100 kg, and therefore when the number of these display devices to be stacked increases, they could not be assembled together easily.

Another problem with the rear projection-type display device is color shift which means that the color varies depending on the viewing angle. In the system using three projection lenses, red (R) image light, green (G) image light and blue (B) image light are incident on the transmission screen at respective different angles, and therefore there exit different viewing angles respectively at which the three (R, G and B) outgoing image light beams have increased intensities. This color change depending on the change of the viewing angle is called "color shift". In the rear projection-type display device employing the conventional CRTs as shown in FIG. 31, the R projection lens and the B projection lens face the transmission screen at respective angles of about ±10°. This angle is called "converging angle". The difference between the viewing angles which make the respective color (R, G and B) image light beams (which go out from the transmission screen) most intense, respectively, is corrected by the transmission screen, and therefore these angles are reduced to about a half of the converging angles. However, there still exists the difference of about ±5° between the viewing angles which make the respective three color (R, G and B) image light beams the most intense, respectively. Therefore, when the screen is assembled in a curved manner, the color balance is lowered particularly at the joint portions of the screen, and in some cases the screen is not suited for practical use.

FIG. 37 is an enlarged, schematic, horizontal cross-sectional view of the joint portion of the screen in the conventional rear projection-type multi-screen display apparatus. In this Figure, the rectangular screens 1 are combined together to provide the overall screen 65 in such a manner that any two of the horizontally-adjacent rectangular screens 1 are connected at an angle of 30° with respect to each other. At the joint portion of the screen 65, viewing angles 81 of the viewer 9 with respect to directions 80 normal respectively to the left and right screens 1 are different in ±15° between the left and right screens 1 as shown in FIG. 37, and therefore a change in the viewing angle causes a change in the color, so that the color balance between the right and left screens is deteriorated.

Furthermore, when the screen is curved, the image light beam is incident upon the screen from that screen generally facing it, so that the contrast of the picture image is affected.

FIG. 38 is a schematic, vertical cross-sectional view of one example of a rear projection-type multi-screen display apparatus having a curved screen. When the screen is curved as shown in FIG. 38, image light going out from one screen surface is reflected by another screen surface, and this reflection light 82 is directed toward the viewer 9, so that the contrast of the picture image is degraded.

U.S. Pat. No. 5,137,450 discloses a rear projection-type multi-display apparatus comprising a plurality of relatively large screens for covering the sight of the viewer. U.S. Pat. No. 5,179,440 discloses a rear projection-type, dome-shaped multi-display apparatus in which a peripheral wall and a ceiling are covered with a plurality of relatively large screens. U.S. Pat. No. 5,253,049 discloses a rear projection-type, tunnel-shaped multi-display apparatus in which side walls of a passage as well as a ceiling are covered with large screens. However, the rear projection-type multi-display apparatuses disclosed in these U.S. patents has a drawback that light, passing through one screen, is incident as external light on another screen, thereby degrading the picture quality.

SUMMARY OF THE INVENTION

With the above problems in view, it is an object of this invention to provide a rear projection-type multi-display apparatus which is curved both in a horizontal visual field direction and a vertical visual field direction, and is light-weight and simple in construction, and can provide the viewer with a picture image simulating the appealing realism.

A specific object of the invention is to provide a rear projection-type multi-display apparatus in which projected light, passed through one screen, is prevented from being incident as external light upon another screen, thus preventing the picture quality from being degraded.

Another specific object of the invention is to provide a rear projection-type multi-display apparatus in which a color change is prevented at the joints of adjacent screens, and an image contrast is prevented from being lowered, thereby providing a high picture quality.

According to one aspect of the present invention, there is provided a rear projection-type multi-display apparatus comprising:

a plurality of rear projection-type display devices each in which projection light from image sources is projected through projection lenses onto a projection rear surface of a rear projection screen to form a picture image on a front viewing surface of the rear projection screen, the plurality of rear projection-type display devices being combined together in contiguous relation to one another to form a large screen;

wherein the large screen has a portion which is formed into a concave surface curved both in a horizontal visibility angle direction and a vertical visibility angle direction.

In one preferred form of the invention, a light-absorbing portion is formed on the front viewing surface of the rear projection screen, and the light-absorbing portion absorbs projection light which passes through one rear projection screen, and is incident as external light on another rear projection screen.

In another preferred formed of the invention, the rear projection screens of part of the rear projection-type display devices have a polygonal shape such as a trapezoidal shape and a pentagonal shape, and the rear projection screens jointly constitutes the large screen having a portion curved both in a horizontal visibility angle direction and a vertical visibility angle direction.

These and other features of the present invention will be described by way of preferred embodiments with reference to the accompanying drawings.

DESCRIPTION OF THE PREFERRED EMBODIMENTS

Figure 1:
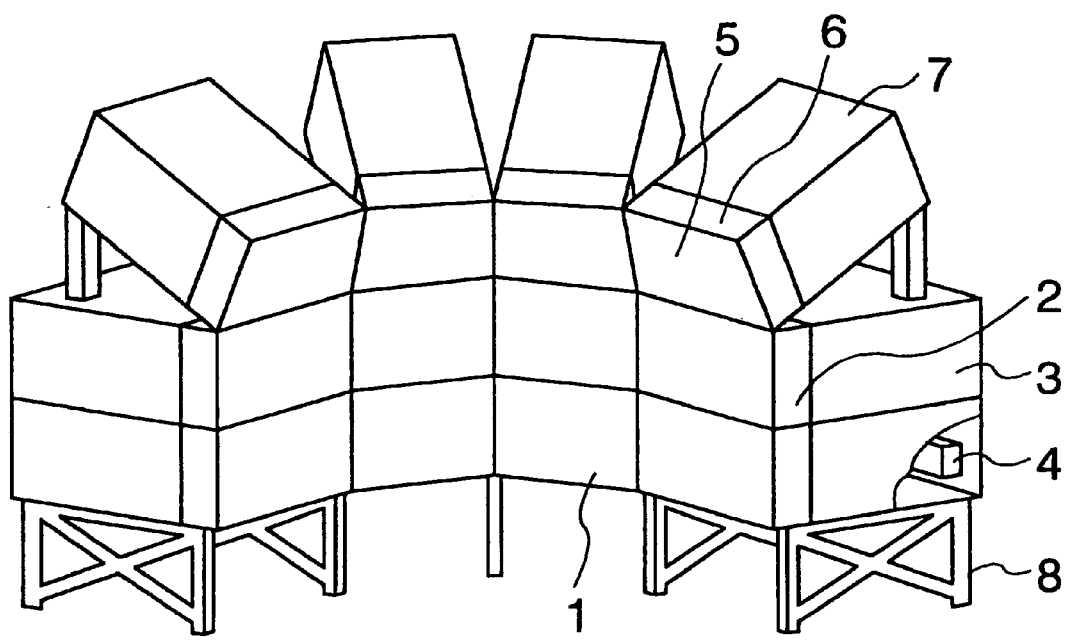
FIG. 1 is a schematic, perspective view illustrating a 1st embodiment of a rear projection-type multi-screen display apparatus of the invention.

FIG. 1 is a perspective view which shows a 1st embodiment of a rear projection-type multi-display apparatus of the present invention. FIG. 2 shows examples of configurations of rear projection screens.

As shown in FIGS. 1 and 2, in the present invention, in addition to rear projection-type display devices each having a transmission screen of a rectangular shape as in the conventional construction, there are employed rear projection-type display devices each having a transmission screen of a trapezoidal shape. With this construction, the overall screen is curved in both vertical and horizontal directions. In the present invention, in order to obtain the screen curved both vertically and horizontally, other constructions than the above construction can be used. These include a construction composed solely of trapezoidal transmission screens, a construction of a regular dodecaheral shape composed of pentagonal transmission screens or a construction composed of part thereof, a soccer ball-like 32-surface construction (having 12 plane surfaces of a regular pentagonal shape and 20 plane surfaces of a regular hexagonal shape; a so-called truncated icosahedron) or a construction composed of part thereof, and a construction comprising transmission screens each having a three-dimensionally curved surface.

In the present invention, in order to enhance the realism of an image, there is used a construction in which the picture image is displayed below the foot of the viewer so that the viewer can look into this picture image, or a construction in which a transparent material is used at the floor or the passage so that the picture image can be viewed through the floor or the passage. There is also used a construction in which an entrance/exit of a dome-shape is provided at the rear side or below the viewer, and a rear projection-type display device also serves as a door of the entrance/exit, and with this construction the entrance/exit is almost or totally out of the sight of the viewer, thereby enhancing the realism.

In the present invention, in order that the rear projection-type multi-screen display apparatus, having a transmission screen structure, can be easily assembled, there is used a construction in which a screen support frame for each individual rear projection-type display device has a truncated pyramid-shaped, hollow construction decreasing in size or cross-sectional area toward the screen surface, or a construction in which a screen support frame is separated from a projection device support frame, and only the screen support frames are first assembled.

Figure 19:
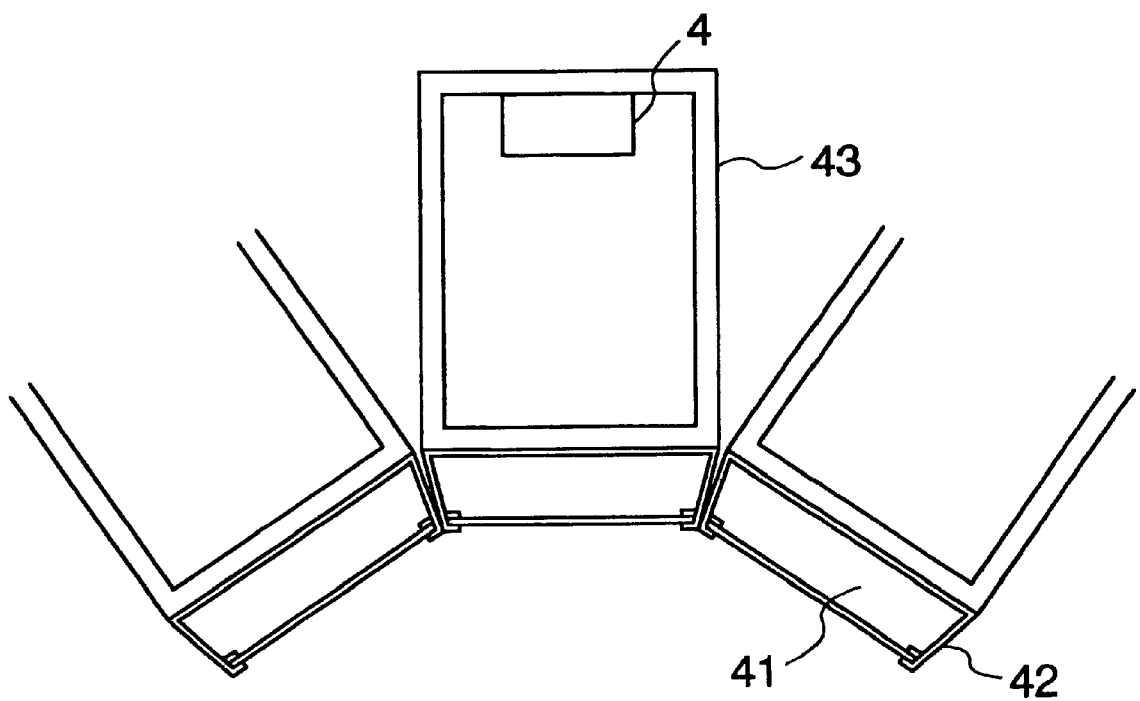
FIG. 19 is a horizontal cross-sectional view illustrating an important portion of a 8th embodiment of a rear projection-type multi-screen display apparatus of the invention.

FIG. 19 is a horizontal cross-sectional view showing rear projection-type display devices each having a screen support frame of a truncated pyramid-shape. In this Figure, the screen support frame 42 supporting a screen 41 is smaller in size at the screen side than a unit support frame 43.

Figure 20:
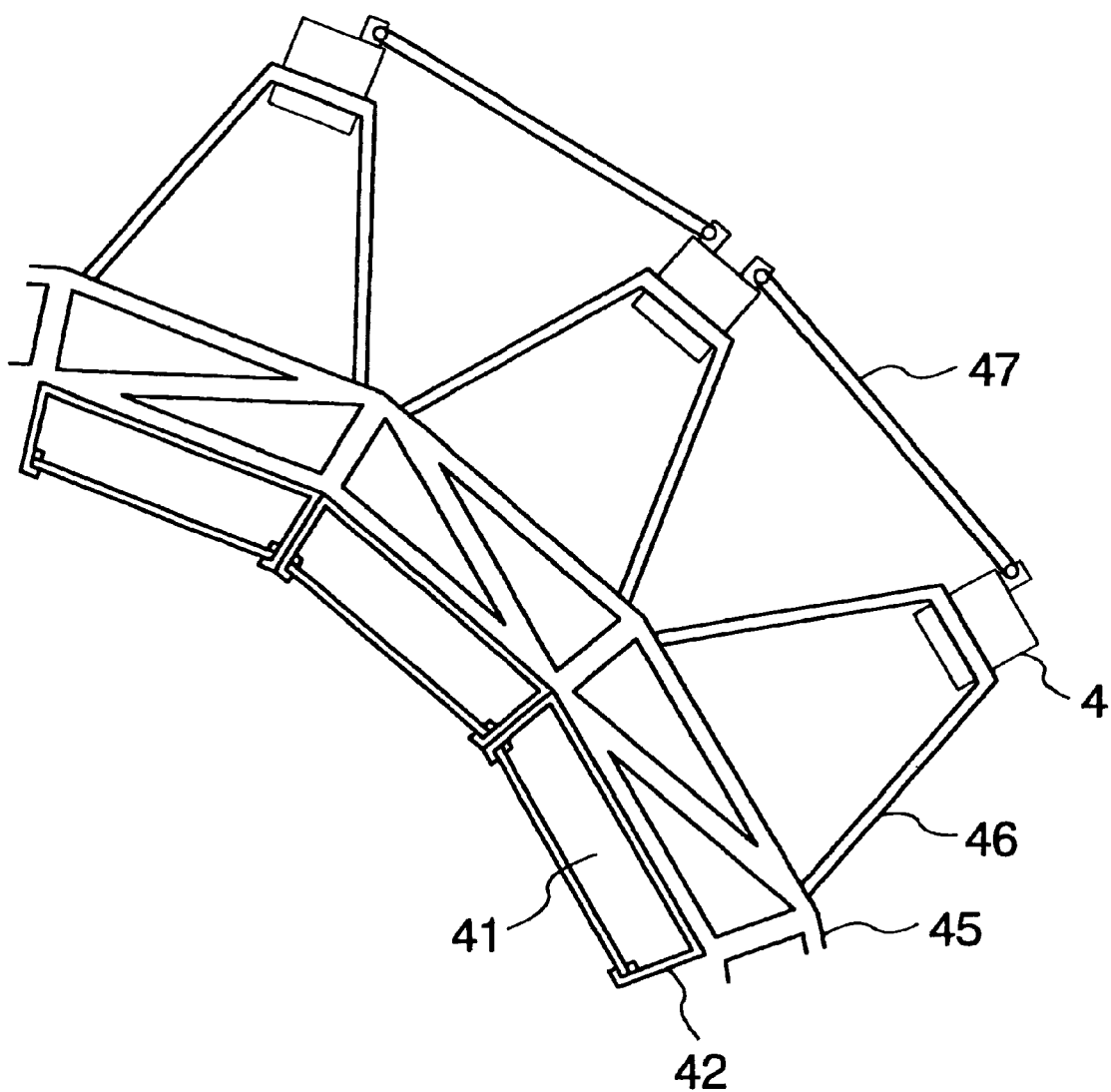
FIG. 20 is a view showing an important portion of a 9th embodiment of a rear projection-type multi-screen display apparatus of the invention.

FIG. 20 is a vertical cross-sectional view showing rear projection-type display devices each having a screen support frame separate from a projection device support frame. In this Figure, the rear projection-type display device comprises the screen support frame 42 supporting the screen 41, a unit support frame 45 supporting the screen support frame 42, a projection device 4, and a projection device support frame 46 supporting the projection device 4. The screen support frames 42 are thus supported by the unit support frame 45. The assembly, composed of the screen support frames 42 and the unit support frames 45, can be independent from one another, and these frames 42, 45 can be self-sustained.

In this construction, when the rear projection-type multi-screen display apparatus is to be assembled, the unit support frames 45 are first assembled, and then the screen support frames 42 are mounted on the unit support frame 45, and finally the projection devices 4 and the projection device support frames 46 are mounted on the unit support frame 45.

In the present invention, in order to enhance the picture quality of a dome-type multi-screen display apparatus, there is used a construction in which three projection lens are not juxtaposed in an inline fashion as in the conventional construction, but are disposed respectively at vertexes of an isosceles triangle, or a construction in which instead of a lenticular lens sheet as used in the conventional construction, a microlens sheet is used in a transmission screen.

Figure 22:
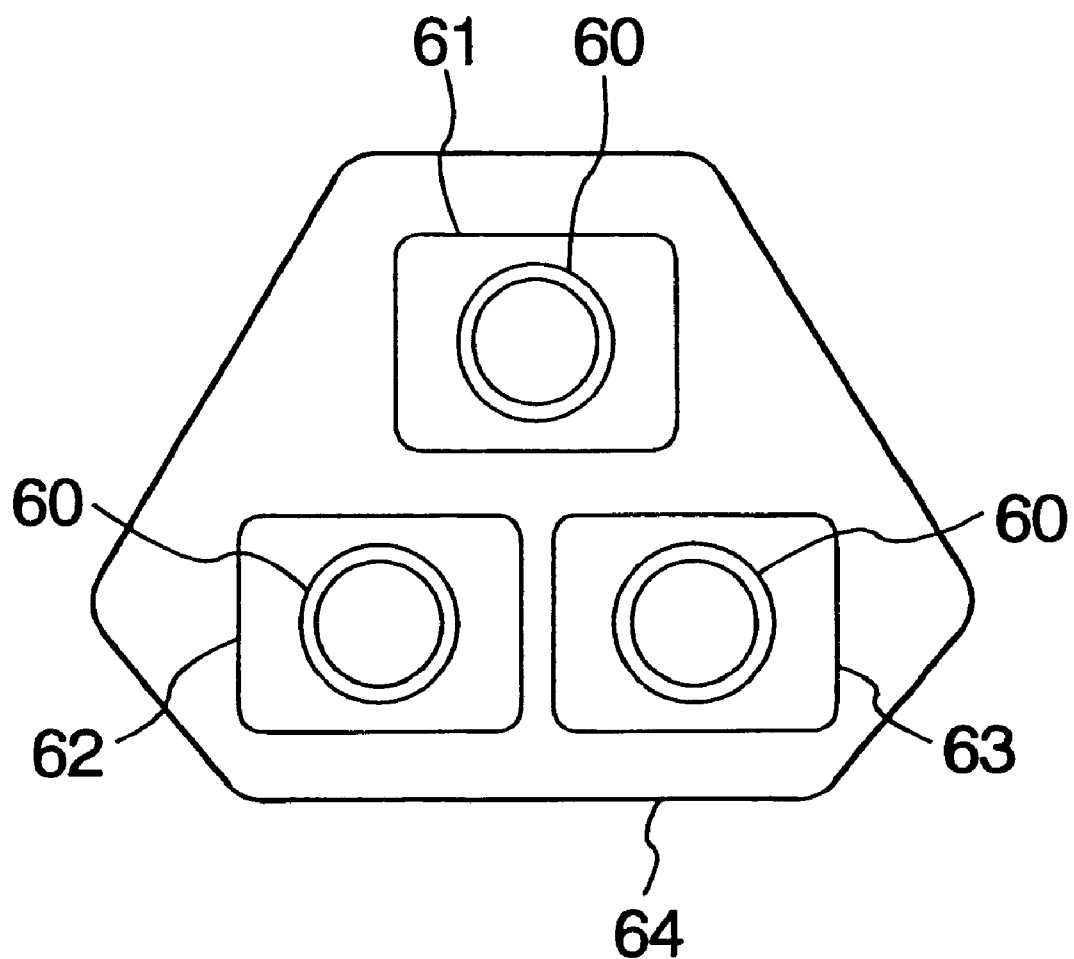
FIG. 22 is a front-elevational view illustrating a projection device used in the rear projection-type display device of the 10th embodiment of the rear projection-type multi-screen display apparatus of the invention.

FIG. 22 is a front-elevational view showing the arrangement of projections lens and projection-type CRTs in which the three projection lenses are disposed at vertexes of an isosceles triangle, respectively. As shown in this Figure, the three CRTs are disposed respectively at vertexes of an isosceles triangle in such a manner that the G projection-type CRT 61 is disposed above the R and B projection-type CRTs 62 and 63 juxtaposed with each other. In the conventional construction, there have been used three brackets respectively connecting the three projection lenses to the three CRTs; however, in the present invention, only a single bracket is used so as have a lightweight construction.

Figure 21:
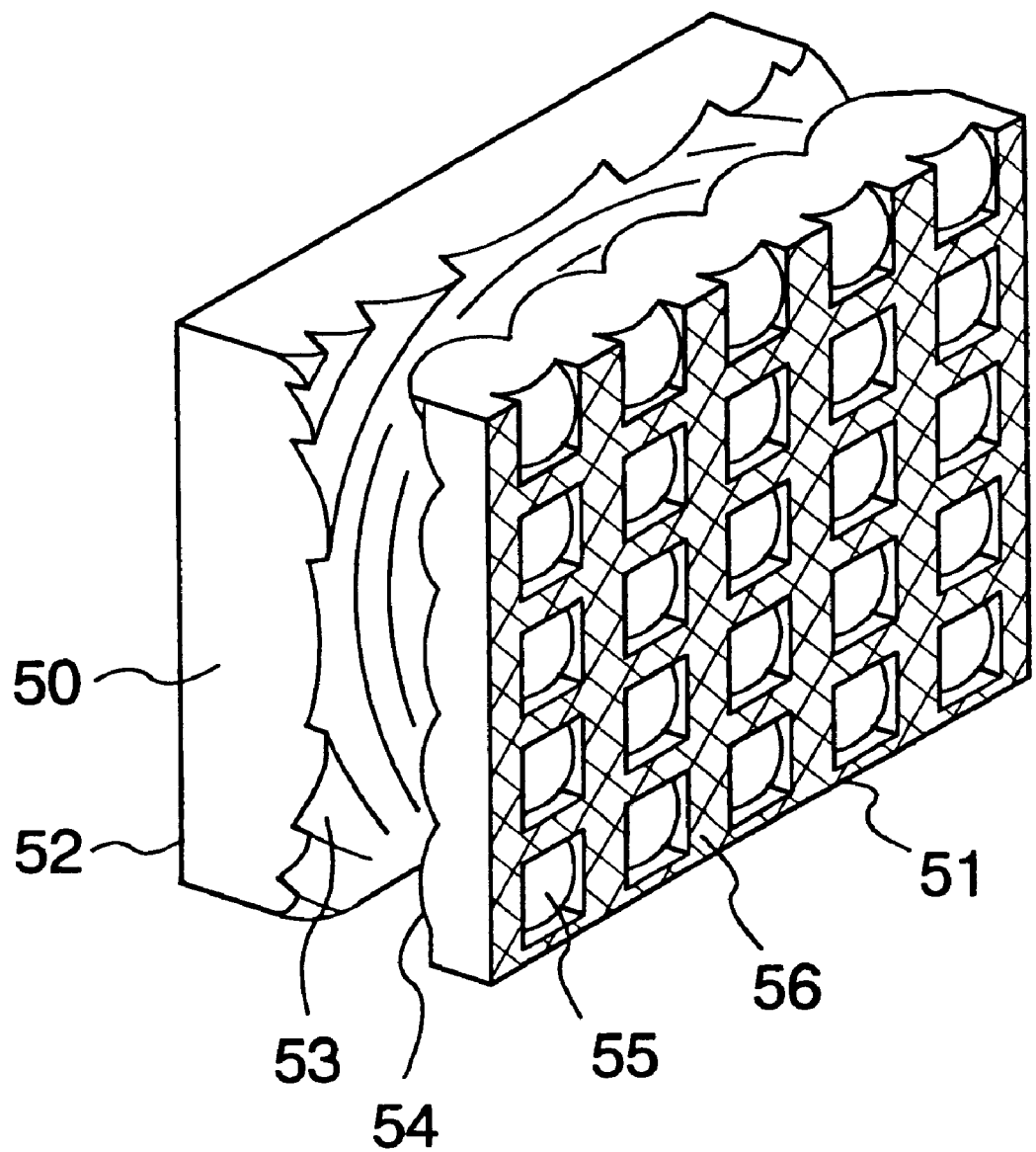
FIG. 21 is a perspective view illustrating a transmission screen used in a rear projection-type display device of a 10th embodiment of a rear projection-type multi-screen display apparatus of the invention.

FIG. 21 is a perspective view which shows an important portion of a transmission screen. In this Figure, the transmission screen comprises two sheets, that is, a microlens sheet 50, and a Fresnel lens sheet 50. The microlens sheet 51 has convex microlens elements formed on its light-incident surface 54, and these microlens elements are convex toward the Fresnel lens sheet 50, and are arranged consecutively in rows and columns, that is, in horizontal and vertical directions of the screen. Microlens elements are also formed on a light-outgoing surface 55 of the microlens sheet 51, and are arranged consecutively in rows and columns, that is, in the horizontal and vertical direction of the screen, these microlens elements being convex in a direction away from the light-incident surface 54, that is, toward the viewer. A grid-like planar portion is formed at the boundaries between the microlens elements on the light-outgoing surface 55, and is raised or projected beyond these lenses. A grid-like light-absorbing portion 56 is formed on this grid-like planar portion. The area ratio of the light-absorbing portion to the overall light-outgoing surface 55 of the microlens sheet 51 is 75%.

In the present invention, an extensive study of the visibility angle of the rear projection-type multi-screen display apparatus has been made, and as a result there have been found the following facts based on which the present invention has been made.

In order to provide such a realism that the viewer can be attracted into the picture image, it is thought to be necessary to provide the picture image capable of covering the visibility angle of about 50° in the vertical direction and the visibility angle of about 120° in the horizontal direction. In the conventional planar multi-screen display, in order to cover such visibility angle, a large screen about 70 inch in vertical size and about 200 inch in horizontal size is necessary when the viewer is spaced 1.5 m from the screen. Even if such a large-size screen is provided, the angle of viewing of the screen edge by the viewer with respect to the direction normal to the screen is about 65°, and the picture image appears much distorted to the viewer, so that the picture image can not be precisely observed. If the visibility angle with respect to the direction normal to the screen is large, the image light will not be directed toward the viewer, so that the apparent brightness is sacrificed.

Therefore, in the large screen covering the above visibility angle, the right- and left-end screens as well as the upper-end screens need to be inclined at least at an angle of 30° with respect to the viewer's line of sight.

In the present invention, there are used the transmission screens having other shape than the rectangular shape of the conventional transmission screen, and the left- and right-end screens as well as the upper-end screens can be suitably inclined toward the viewer, and therefore the visibility angle can be widened with a smaller area of the screen. Besides, the line normal to the screen can be inclined toward the viewer, the apparent distortion of the picture image is reduced, and the bright picture image can be provided.

In the present invention, the picture image can be enlarged all around the viewer and beneath the viewer, and therefore even when the viewer moves his head or looks at his foot, the picture image is not interrupted, thus further enhancing the realism easily.

Where there are used the projection devices each having the projection lenses arranged respectively at the vertexes of an isosceles triangle, the converging angle of the R and B projection lenses in the horizontal direction of the screen can be reduced to 50% of that in the conventional construction, that is, from ±10° to ±5°. Therefore, the color shift can be reduced to 50% of that encountered by the conventional construction, and the color difference between the rear projection-type display devices is reduced. In this case, since the projection lenses are arranged in an inline fashion in the conventional construction, any color shift never develops in the vertical direction of the screen; however, in the isosceles arrangement of the present invention, the converging angle of ±4° develops in the vertical direction. However, the absolute value of the converging angle is reduced to not more than a half of that in the conventional construction, the color change is insignificant.

As a result of using the microlens sheet in the transmission screen, the light-absorbing portion has the grid-shape in contrast with the conventional light-absorbing portion of a striped configuration. As a result, the area ratio of the light-absorbing portion is increased to about 150% of that achieved with the conventional lenticular lens sheet. Therefore, reflection of image light (coming from another screen) on the screen surface is reduced to 50% of that experienced with the conventional lenticular lens sheet, so that the picture image of a better contrast can be provided.

The use of the single bracket for supporting the three projection lens of the projection device reduces the overall weight of the projection device. Besides, each screen support frame can be independent from one another, that is, self-sustained, and therefore even if the projection device support member is of a lightweight design, a sufficient strength is achieved, and this reduces the overall weight of the display apparatus, and the display apparatus can be assembled more easily.

When the above rear projection-type multi-screen display apparatus of the present invention is used in a display system for a play apparatus in an amusement park, a training apparatus such as a drive simulator and a flight simulator, or the like, a wider angle of visibility can be obtained, thereby providing the more appealing realism. This provides a simulation space which makes the viewer feel as if he were in the scene in the picture image so that the viewer can perceive the realism, thereby enhancing the quality of the play and the degree of the training.

1st Embodiment

A rear projection-type multi-screen display apparatus shown in FIG. 1 comprises rear projection-type display devices each having a rectangular screen with the aspect ratio of 4:3, and rear projection-type display devices each having a trapezoidal screen in which the length ratio of the bottom side to the top side is 4:3.

In the rear projection-type multi-screen display apparatus of this embodiment, the rear projection-type display devices are arranged in 3 rows and 4 columns, and the four rear projection-type display devices in the uppermost row have the respective transmission screens of a trapezoidal shape, and the rear projection-type display devices in the other rows have the respective transmission screens of a rectangular shape, as shown in FIG. 1. The rear projection-type display devices in the uppermost row are inclined forwardly, and the overall screen of the display apparatus is curved in a horizontal direction.

In FIG. 1, reference numeral 1 denotes the rectangular screen, reference numeral 2 a screen support frame supporting the rectangular frame 1, reference numeral 3 a unit support frame which contains a projection device 4, and has the screen support frame 2 mounted on its front side, reference numeral 5 the trapezoidal screen, reference numeral 6 a trapezoidal screen support frame supporting the trapezoidal screen 5, and reference numeral 7 a unit support frame which contains a projection device (not shown), and has the trapezoidal screen support frame 6 mounted on its front side. The rear projection-type multi-screen display apparatus is mounted and supported on support bases 8.

Figure 2A:
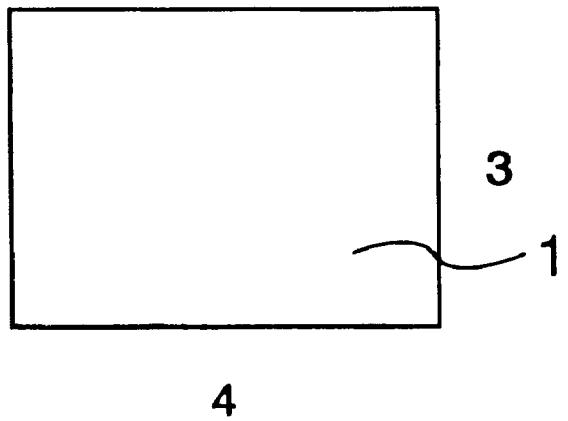
FIGS. 2a and 2b are front-elevational views illustrating rectangular and trapezoidal transmission screens, respectively, in the 1st embodiment.
Figure 2B:
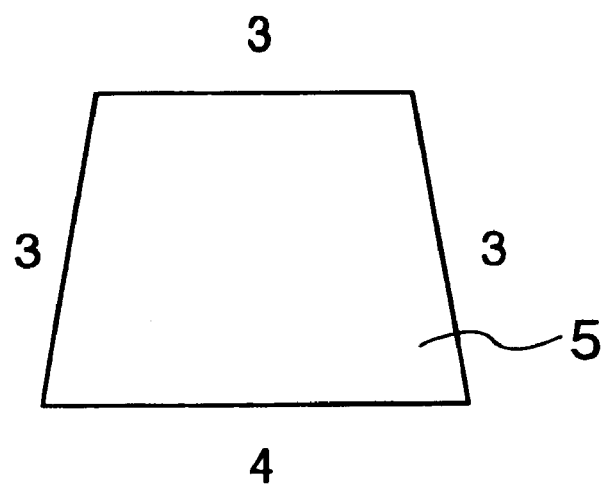

FIG. 2a is a front-elevational view of the rectangular screen 1, and FIG. 2b is a front-elevational view of the trapezoidal screen 5. As shown in FIG. 2a, the width-height ratio of the rear projection-type display device (the rectangular screen 1) having the rectangular transmission screen is 4:3 as shown in FIG. 2a, and a diagonal length of the screen is 40 inch. As shown in FIG. 2b, the ratio of the bottom side to each of the other three sides of the rear projection-type display device (the trapezoidal screen 5) having the trapezoidal transmission screen is 4:3, and thus the length of the bottom side is equal to the width of the rectangular screen 1.

Figure 3:
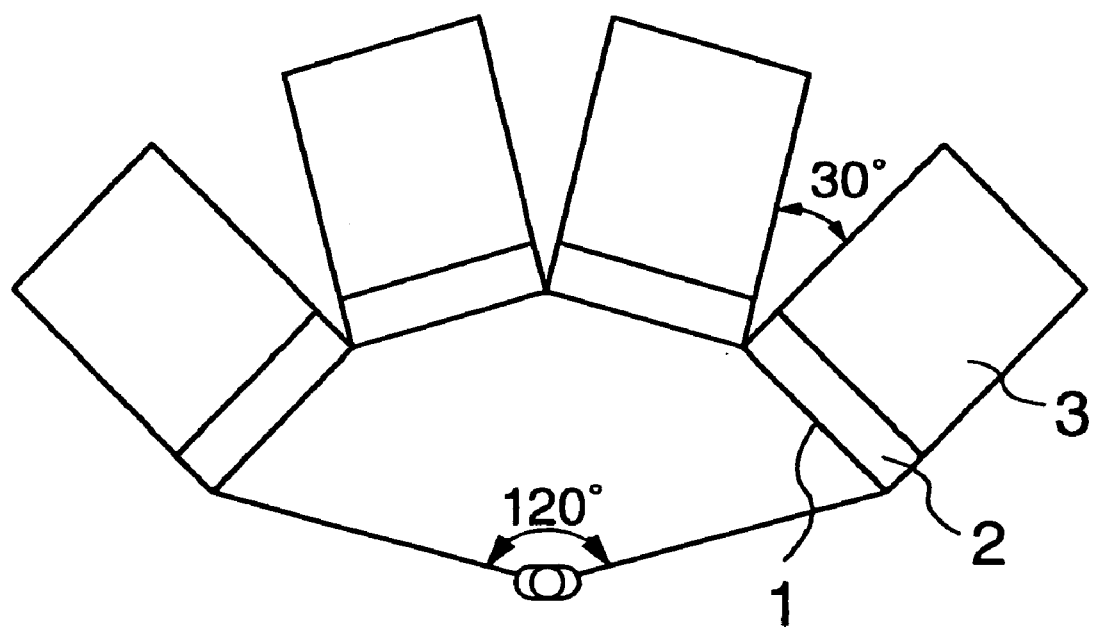
FIG. 3 is a horizontal cross-sectional view illustrating the 1st embodiment of the rear projection-type multi-screen display apparatus of the invention.

FIG. 3 is a horizontal cross-sectional view showing the arrangement of the rear projection-type display devices each with the rectangular screen in the rear projection-type multi-screen display apparatus of FIG. 1. As shown in FIG. 3, the rear projection-type display devices each having the rectangular screen are arranged at an angle of about 30° with respect to one another.

Figure 4:
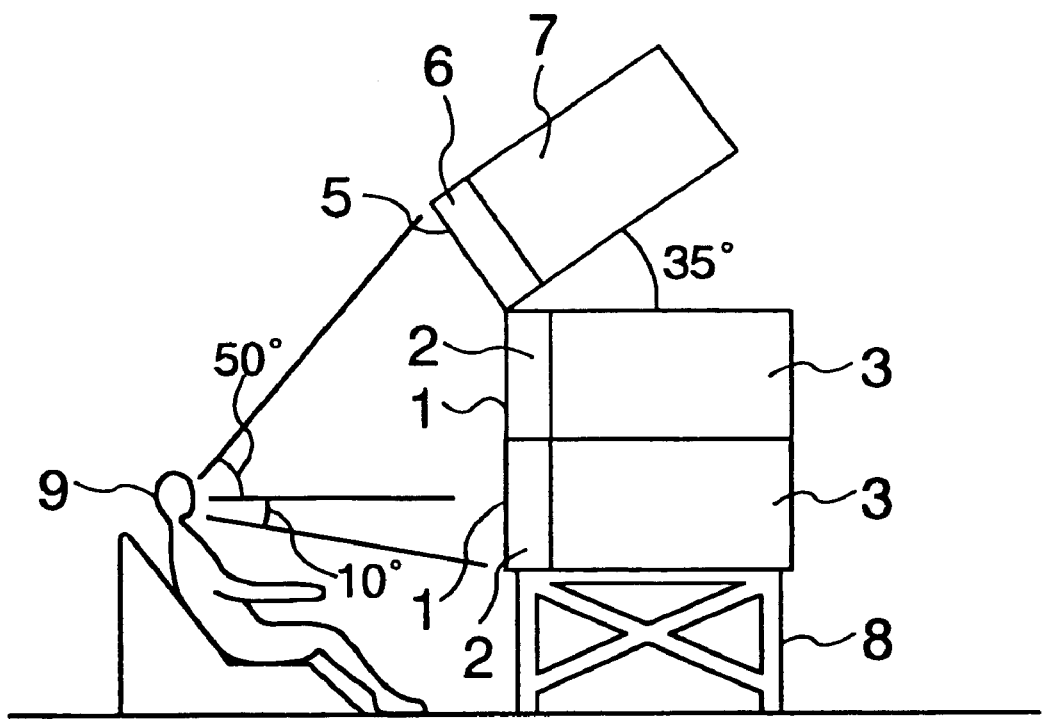
FIG. 4 is a vertical cross-sectional view illustrating the 1st embodiment of the rear projection-type multi-screen display apparatus of the invention.

FIG. 4 is a vertical cross-sectional view of the rear projection-type multi-screen display apparatus of FIG. 1, showing the arrangement of the display devices. In the rear projection-type multi-screen display apparatus of this embodiment, the rear projection-type display devices each having the trapezoidal screen are inclined forwardly at an angle of about 35° with respect to the rear projection-type display devices each having the rectangular screen, as shown in FIG. 4.

The operation of the rear projection-type multi-screen display apparatus of this embodiment will now be described. Image light, emitted from the projection device 4 in each of the rear projection-type display devices, passes through the transmission screen 1, 5 to reach the viewer 9. Here, if the viewer 9 is sitting at a position spaced 1.5 m from the central portion of the screen, and views the screen, a visibility angle in the horizontal direction is 120° as shown in FIG. 3. A visibility angle in the downward direction (vertical direction) is 10°, and a visibility angle in the upward direction (vertical direction) is 50°. Therefore, the images adjacent to one another are all combined together to provide the overall image which causes the enhanced realism in the field of vision of the viewer.

As is clear from the above description, the rear projection-type multi-screen display apparatus of this embodiment can provide the picture image which achieves the wide visibility angle in the upward, right and left directions, and provides the enhanced realism. With this 12-surface multi-screen system, sufficient brightness and fineness can be achieved.

In the rear projection-type multi-screen display apparatus of this embodiment, the rear projection-type display devices having the rectangular transmission screen of the conventional type can be used, and besides the display apparatus can be constituted by the two kinds of rear projection-type display devices, that is, the display devices with the rectangular transmission screen and the display devices with the trapezoidal transmission screen, and therefore the productivity is excellent.

In this embodiment, although the display devices are arranged in 3 rows and 4 columns, the invention is not limited to such an arrangement, and various modifications can be made. For example, the number of the display devices (and hence the screens) can be increased in the directions of the height and width, and the angle between the adjacent screens can be increased.

2nd Embodiment

A second embodiment of the present invention will now be described with reference to FIGS. 5 to 8.

Figure 5:
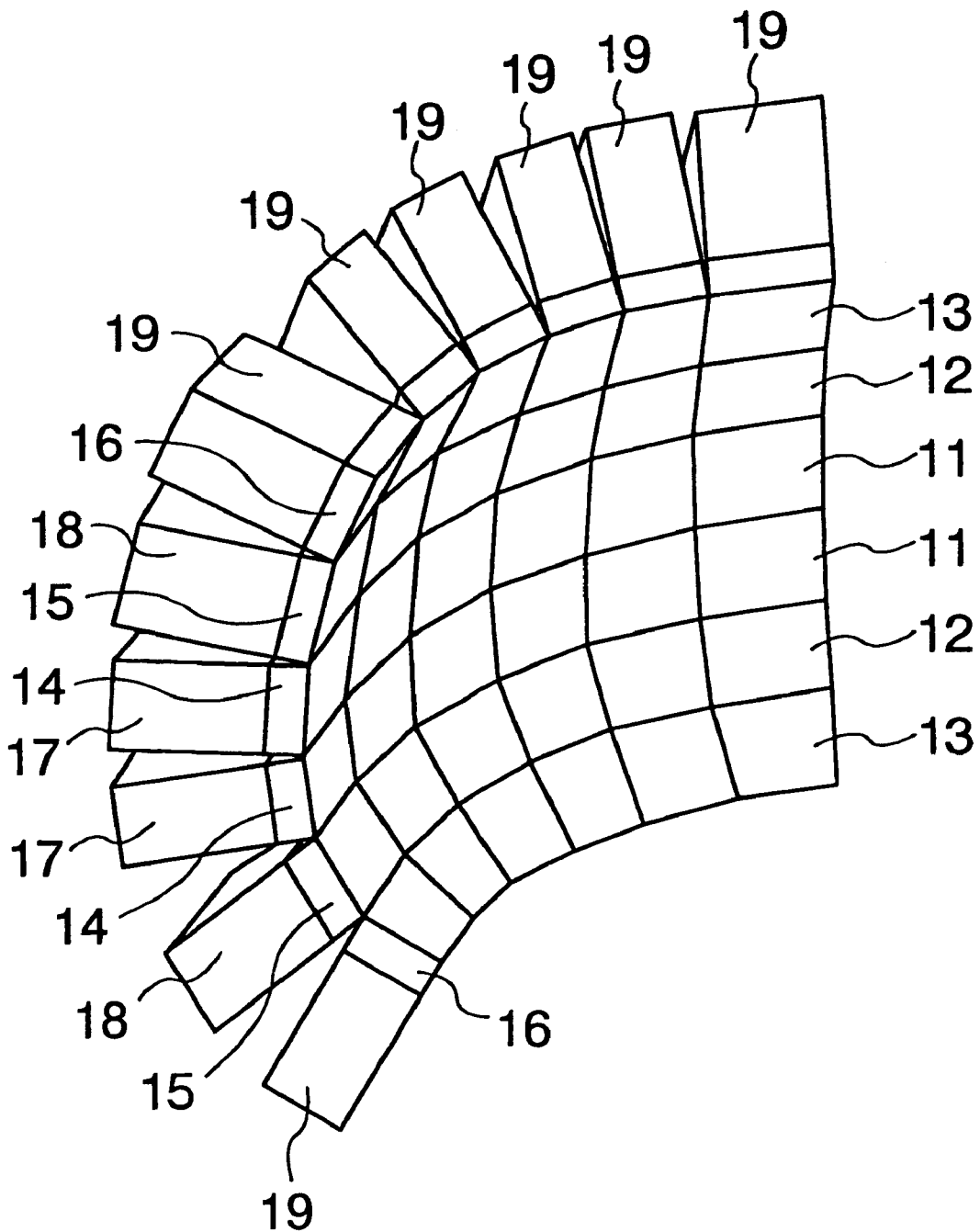
FIG. 5 is a perspective view illustrating a 2nd embodiment of a rear projection-type multi-screen display apparatus of the invention.

FIG. 5 is a schematic, perspective view which shows the second embodiment of a rear projection-type multi-screen display apparatus of the invention. The rear projection-type multi-screen display apparatus of this embodiment comprises rear projection-type display devices having respective trapezoidal transmission screens, and these display devices are arranged in 6 rows and 6 columns.

The rear projection-type display devices in FIG. 5 are combined together at an angle of 20° with respect to one another in both horizontal and vertical directions. The rear projection-type multi-screen display apparatus comprises three kinds of rear projection-type display devices having the respective transmission screens of different trapezoidal shapes.

In FIG. 5, reference numeral 11 denotes the trapezoidal screen of a first trapezoidal shape, reference numeral 14 a trapezoidal screen support frame supporting the trapezoidal screen 11, reference numeral 17 a unit support frame having the trapezoidal screen support frame 14 mounted thereon, reference numeral 12 a trapezoidal screen of a second trapezoidal shape, reference numeral 15 a trapezoidal screen support frame supporting the trapezoidal screen 12, reference numeral 18 a unit support frame having the trapezoidal screen support frame 15 mounted thereon, reference numeral 13 a trapezoidal screen of a third trapezoidal shape, reference numeral 16 a trapezoidal screen support frame supporting the trapezoidal screen 13, and reference numeral 19 a unit support frame having the trapezoidal screen support frame 16 mounted thereon. The rear projection-type display devices in the uppermost and lowermost rows have the trapezoidal screens 13 of the third trapezoidal shape, respectively. The rear projection-type display devices in the second rows from the top and the bottom have the trapezoidal screens 12 of the second trapezoidal shape, respectively. The rear projection-type display devices in the central two rows have the trapezoidal screens 11 of the first trapezoidal shape, respectively.

Figure 6A:
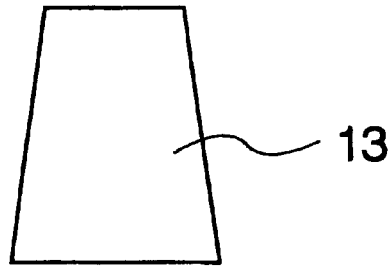
FIGS. 6a to 6c are front-elevational views illustrating three kinds of trapezoidal transmission screens, respectively, in the 2nd embodiment.
Figure 6B:
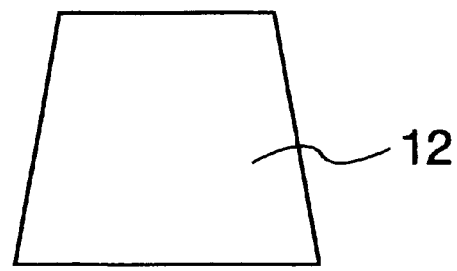
Figure 6C:
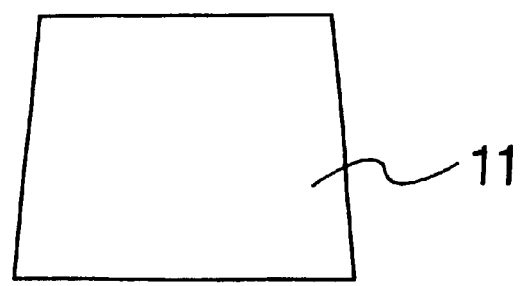

FIG. 6a is a front-elevational view which shows the trapezoidal screen 13 of the third trapezoidal shape, FIG. 6b is a front-elevational view which shows the trapezoidal screen 12 of the second trapezoidal shape, and FIG. 6c is a front-elevational view which shows the trapezoidal screen 11 of the first trapezoidal shape. Here, for convenience' sake, the bottom side of the trapezoidal shape means the longer side while the top side thereof means the shorter side. The bottom side of the transmission screen (trapezoidal screen 13) of each of the rear projection-type display devices in the uppermost and lowermost rows is equal in length to the top side of the transmission screen (trapezoidal screen 12) of each of the rear projection-type display devices in the second rows from the top and the bottom. The bottom side of the transmission screen (trapezoidal screen 12) of each of the rear projection-type display devices in the second rows from the top and the bottom is equal in length to the top side of the transmission screen (trapezoidal screen 11) of each of the rear projection-type display devices in the central two rows.

Figure 7:
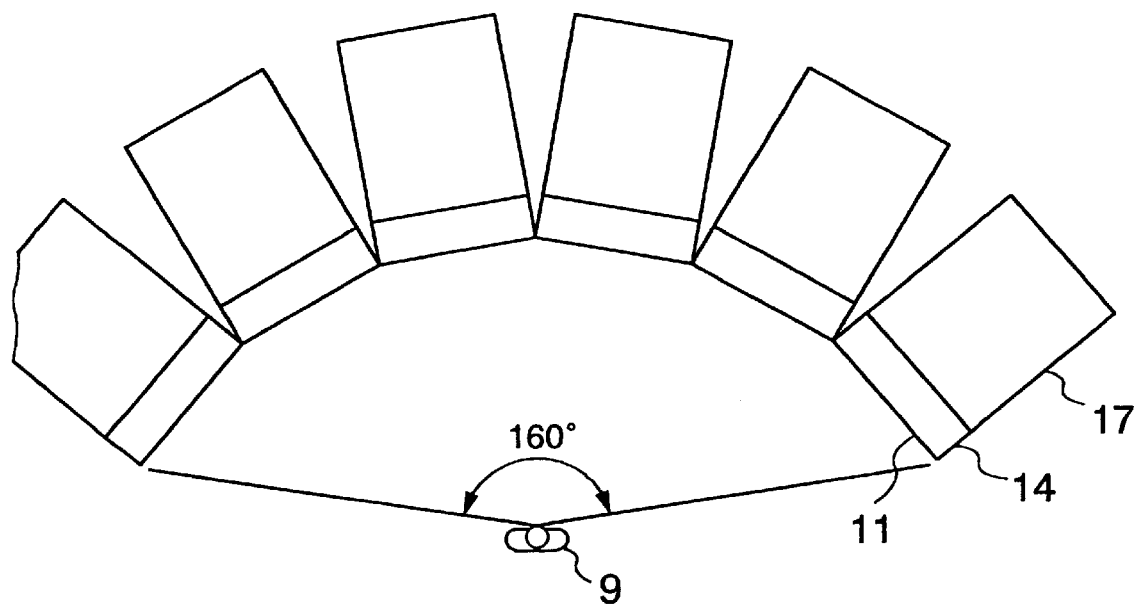
FIG. 7 is a horizontal cross-sectional view illustrating the 2nd embodiment of the rear projection-type multi-screen display apparatus of the invention.

FIG. 7 is a schematic, horizontal cross-sectional view which shows the rear projection-type multi-screen display apparatus of this embodiment taken along the line laid centrally of the height thereof. As shown in this Figure, in the rear projection-type multi-screen display apparatus of this embodiment, the overall screen generally surrounds the viewer 9 at a viewing angle of 160° in a right-left direction.

Figure 8:
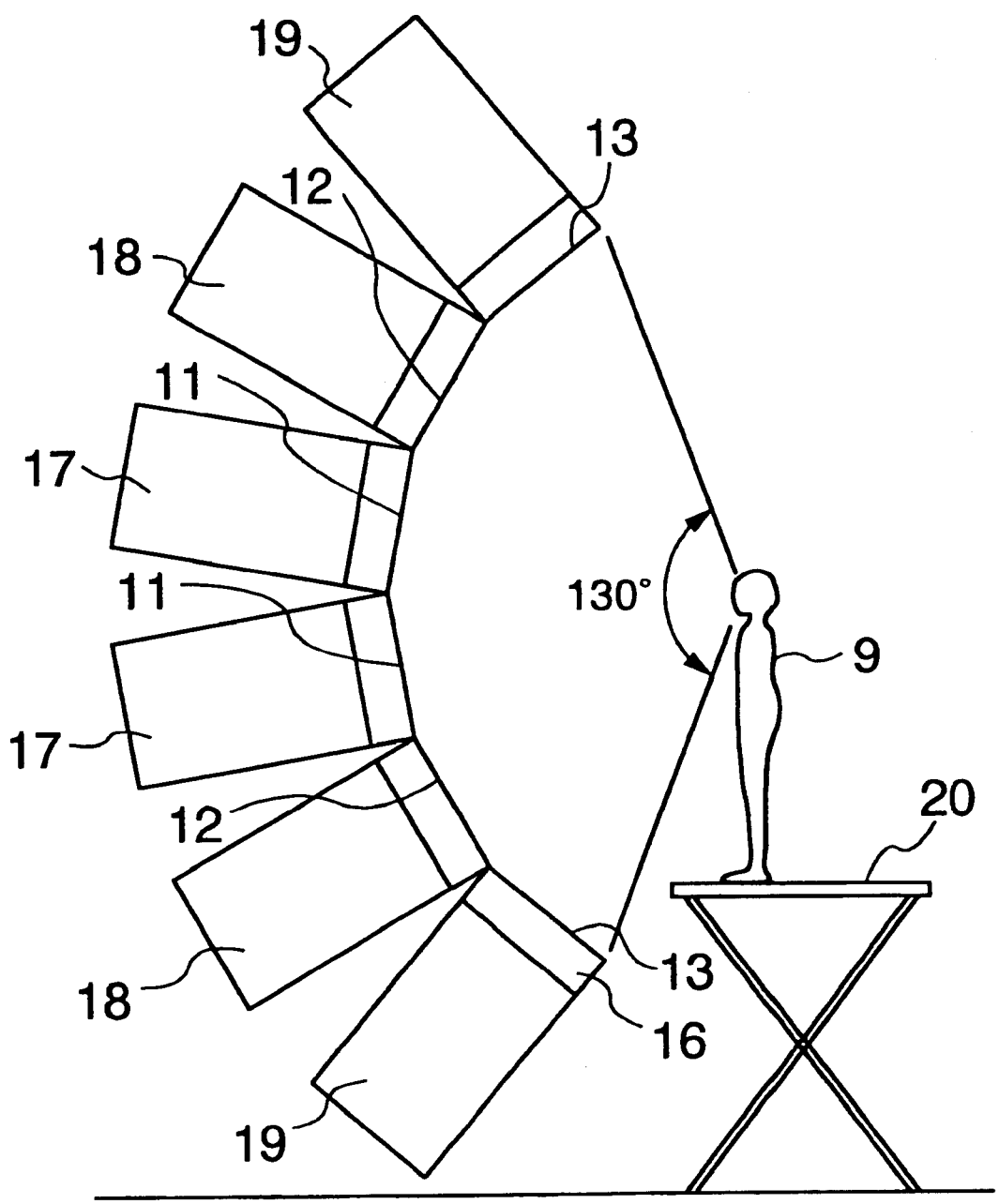
FIG. 8 is a vertical cross-sectional view illustrating the 2nd embodiment of the rear projection-type multi-screen display apparatus of the invention.

FIG. 8 is a schematic, vertical cross-sectional view which shows the rear projection-type multi-screen display apparatus of this embodiment taken along the line laid centrally of the width thereof. As shown in this Figure, the upper and lower portions of the overall screen are inclined to be directed toward the viewer 9, and the overall screen generally surrounds the viewer 9 at a viewing angle of 130° in a vertical direction. In this embodiment, the lower end of the overall screen is located at a level below a floor 20 on which the viewer 9 stands.

The operation of the rear projection-type multi-screen display apparatus of this embodiment will now be described. Image light, emitted from a projection device in each of the rear projection-type display devices, passes through the transmission screen 11, 12, 13 to reach the viewer 9. Here, if the viewer 9 is standing at a position spaced 1.5 m from the central portion of the screen, with the eyes of the viewer kept at a level equal to that of the central portion of the screen, and views the screen, a visibility angle in a sagittal direction is about 160° as shown in FIG. 7, a visibility angle in a meridional direction is about 65° in both upward and downward directions, as shown in FIG. 8. Besides, since the lower end of the screen is disposed at a level below the floor 20 on which the viewer 9 stands, the picture image is extended to the foot of the viewer 9.

As described above, the rear projection-type multi-screen display apparatus of this embodiment can provide the picture image which achieves the wide visibility angle, and provides the enhanced realism as in the rear projection-type multi-screen display apparatus of the first embodiment. Besides, with this multi-screen system, sufficient brightness and fineness can be achieved.

The rear projection-type multi-screen display apparatus of this embodiment has a shape closer to a spherical shape than the rear projection-type multi-screen display apparatus of the first embodiment, and therefore can provide the more natural realism. Furthermore, the display apparatus of this embodiment achieves the wider visibility angle than the display apparatus of the first embodiment, and provides the picture image extended to the foot of the viewer, so that the more appealing realism can be achieved.

In this embodiment, although the display devices are arranged in 6 rows and 6 columns, the invention is not limited to such an arrangement, and the number of the display devices can be increased in the horizontal direction, and the angle of coverage of the overall screen can be increased, so that the screen is formed into a semi-spherical configuration or a spherical configuration so as to surround the viewer. In the case of entirely surrounding the viewer by the overall screen, there can be used an arrangement in which the overall screen is expanded in the vertical direction, and screens of a square shape corresponding in number to the horizontally-arranged screens in each horizontal row are provided at a ceiling portion, thereby providing a completely spherical picture image.

3rd Embodiment

A third embodiment of the present invention will now be described with reference to FIG. 9.

Figure 9:
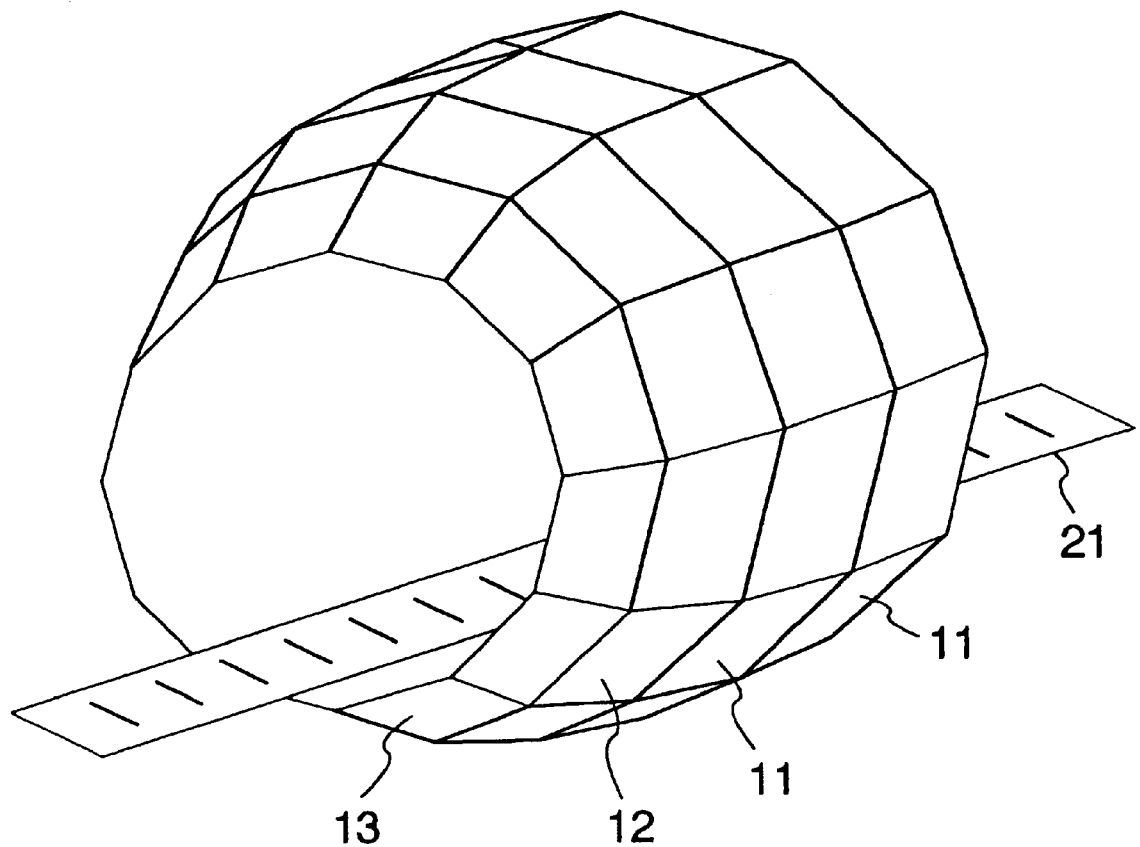
FIG. 9 is a perspective view showing a screen structure of a 3rd embodiment of a rear projection-type multi-screen display apparatus of the invention.

FIG. 9 is a perspective view which shows the 3rd embodiment of a rear projection-type multi-screen display apparatus of the invention. In this Figure, for better understanding of a screen structure, the projection devices, screen support structures and so on are omitted from the figure.

As shown in FIG. 9, the rear projection-type multi-screen display apparatus of this embodiment is formed into a tunnel-like configuration having narrow or constricted entrance and exit. The screen structure of this embodiment is obtained by expanding the rear projection-type multi-screen display apparatus of the second embodiment in the horizontal direction into a generally cylindrical configuration, and then by upwardly turning or tilting this structure by 90 degrees. The opposite open ends serve as the entrance and the exit, respectively. A transparent viewing passage 21 having a width of 1 m extends through the entrance and the exit, and this viewing passage 21 is suspended in the tunnel, such as a bridge.

The operation of the rear projection-type multi-screen display apparatus of this embodiment will now be described. Image light, emitted from the projection device in each of rear projection-type display devices, passes through the transmission screen to reach the viewer. Therefore, the viewer is surrounded by a tunnel-like picture image, and besides the viewer can watch the image at his foot through the bridge-like passage 21, so that this construction can provide the picture image simulating the enhanced realism. If the width of the bridge-like passage 21 is not less than 2 m, the realism is degraded. In contrast, if this width is not more than 0.5 m, this is dangerous, and hence is not proper. In this embodiment, since the entrance and exit of the tunnel-like display apparatus are narrower or constricted than the interior thereof, they are less conspicuous, thus achieving the enhanced realism.

As described above, the rear projection-type multi-screen display apparatus of this embodiment can provide the picture image which achieves the wide visibility angle, and provides the enhanced realism as in the above embodiments. Besides, with this multi-screen system, sufficient brightness and fineness can be achieved.

Furthermore, in the rear projection-type multi-screen display apparatus of this embodiment, the viewer feels that he crosses a bridge in a simulation space, and therefore the picture image giving the more enhanced realism can be provided.

4th Embodiment

A 4th embodiment of the present invention will now be described with reference to FIGS. 10 and 11.

Figure 10:
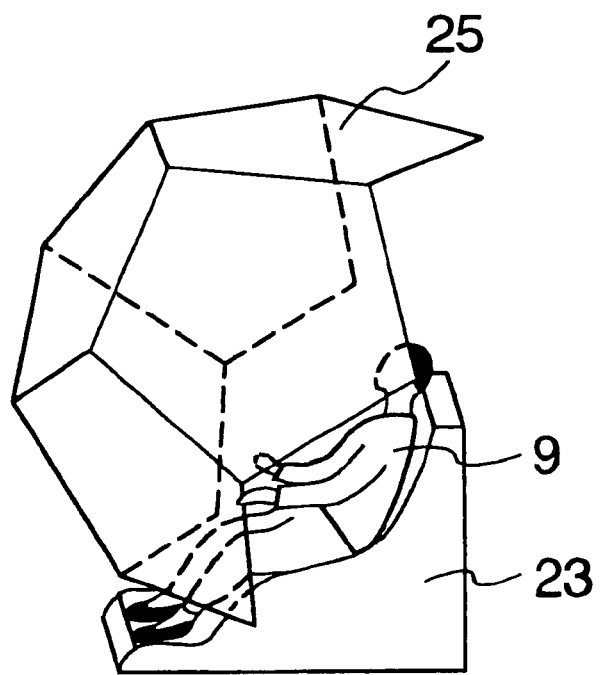
FIG. 10 is a perspective view showing a screen structure of a 4th embodiment of a rear projection-type multi-screen display apparatus of the invention.

FIG. 10 is a perspective view which shows a screen structure of a rear projection-type multi-screen display apparatus of the 4th embodiment. In this Figure, for better understanding of the screen structure, the projection devices, screen support structures and so on are omitted from the figure.

As shown in FIG. 10, the screen of the rear projection-type multi-screen display apparatus of this embodiment is in the form of part of a regular dodecahedral shape (having 12 plane surfaces) circumscribed by a spherical surface, and comprises six rear projection-type display devices each having a transmission screen 25 of a regular pentagonal shape.

Figure 11:
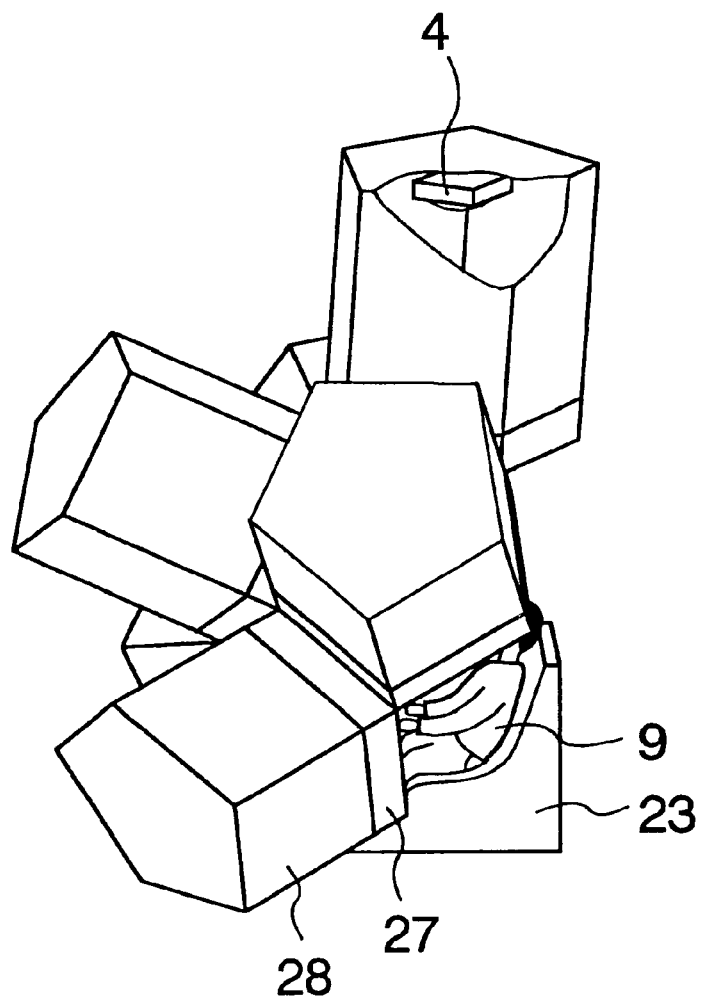
FIG. 11 is a perspective view illustrating the 4th embodiment of the rear projection-type multi-screen display apparatus of the invention.

FIG. 11 is a perspective view which shows the rear projection-type multi-screen display apparatus of this embodiment containing the projection devices 4. In this Figure, reference numeral 27 denotes a screen support frame supporting the screen 25 of a regular pentagonal shape, and reference numeral 28 denotes a unit support frame which contains the projection device 4, and has the screen support frame 27 mounted thereon. As shown in FIG. 11, the projection devices 4 are disposed outside of the dome formed by the screens 25, and are arranged surrounding the viewer 9. A viewer's seat 23 is slidable forward and backward, and after the viewer 9 is seated on the viewer's seat 23, this seat 23 is slidingly moved into the dome from the rear side.

The operation of this embodiment will now be described. Image light, emitted from the projection device of each of the rear projection-type display devices, passes through the transmission screen to reach the viewer 9. At this time, the rear projection-type multi-screen display apparatus of this embodiment provides the viewer 9 with a picture image which has a visibility angle of not less than 150° in a right-left direction (sagittal direction), a visibility angle of about 120° in an upward direction and a visibility angle of about 40° in a downward direction.

As described above, the rear projection-type multi-screen display apparatus of this embodiment can provide the picture image which achieves the wide visibility angle, and provides the enhanced realism as in the above embodiments. Besides, with this multi-screen system, sufficient brightness and fineness can be achieved.

The rear projection-type multi-screen display apparatus of this embodiment can provide the picture image which almost fully covers the viewer's field of vision in the upward, right and left directions, the more enhanced realism can be provided. Besides, since the dome is close to a spherical shape, the viewing position can be located close to a line normal to the central portion of the screen, so that the dome-shaped image, which will not cause the viewer to have an unnatural sense, can be provided. Since the entrance/exit is provided at the rear side of the display apparatus, the viewer, located at the predetermined viewing position, can not see the entrance/exit, and therefore the realism is further enhanced.

In the rear projection-type multi-screen display apparatus of this embodiment, the system can be constituted by one kind of rear projection-type display devices each having the transmission screen of a regular pentagonal shape, and therefore the productivity is excellent.

Although this embodiment is directed to the pseudo semi-spherical construction constituted by the six rear projection-type display devices, the invention is not limited to such a construction, and the number of the display devices can be increased.

5th Embodiment

A fifth embodiment of the present invention will now be described with reference to FIGS. 12 and 13.

Figure 12:
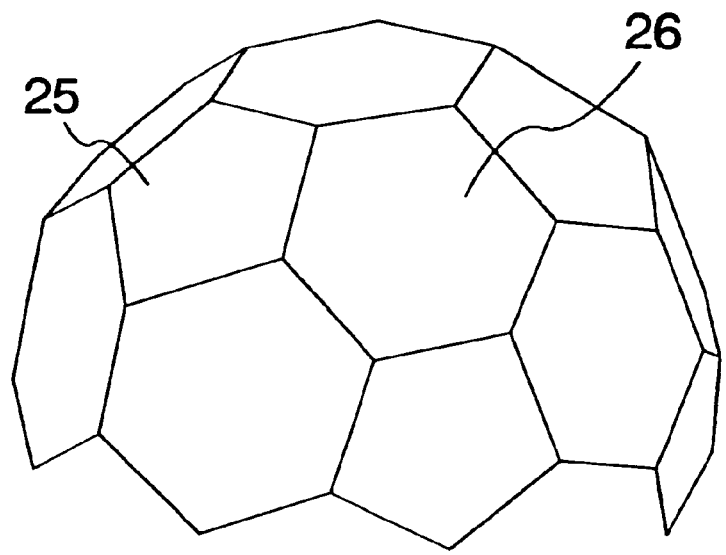
FIG. 12 is a perspective view showing a screen structure of a 5th embodiment of a rear projection-type multi-screen display apparatus of the invention.

FIG. 12 is a perspective view which shows the fifth embodiment of a rear projection-type multi-screen display apparatus of the invention. In this Figure, for better understanding of a screen structure, the projection devices, screen support structures and so on are omitted from the figure.

The screen surface of the rear projection-type multi-screen display apparatus of this embodiment has a shape circumscribed by a spherical surface, and is defined by part of a soccer ball-like 32-surface construction (having 12 plane surfaces of a regular pentagonal shape and 20 plane surfaces of a regular hexagonal shape; a so-called truncated icosahedron) obtained by using 12 rear projection-type display devices each having a transmission screen of a regular pentagonal shape and 20 rear projection-type display devices each having a transmission screen of a regular hexagonal shape. More specifically, the rear projection-type multi-screen display apparatus of this embodiment comprises 6 rear projection-type display devices each having a transmission screen 25 of a regular pentagonal shape and 10 rear projection-type display devices each having a transmission screen 26 of a regular hexagonal shape. With this construction, the screen of the display apparatus has a pseudo semispherical shape closer to a spherical surface than the dome of the 4th embodiment.

Each side of each regular pentagonal transmission screen 25, as well as each side of each regular hexagonal transmission screen 26, is 20 inch, and the diameter of the spherical construction is about 4 m, and therefore this pseudo semi-spherical dome has a sufficient space to enable one to four viewers to watch a picture image over the entire dome-shaped area.

Figure 13:
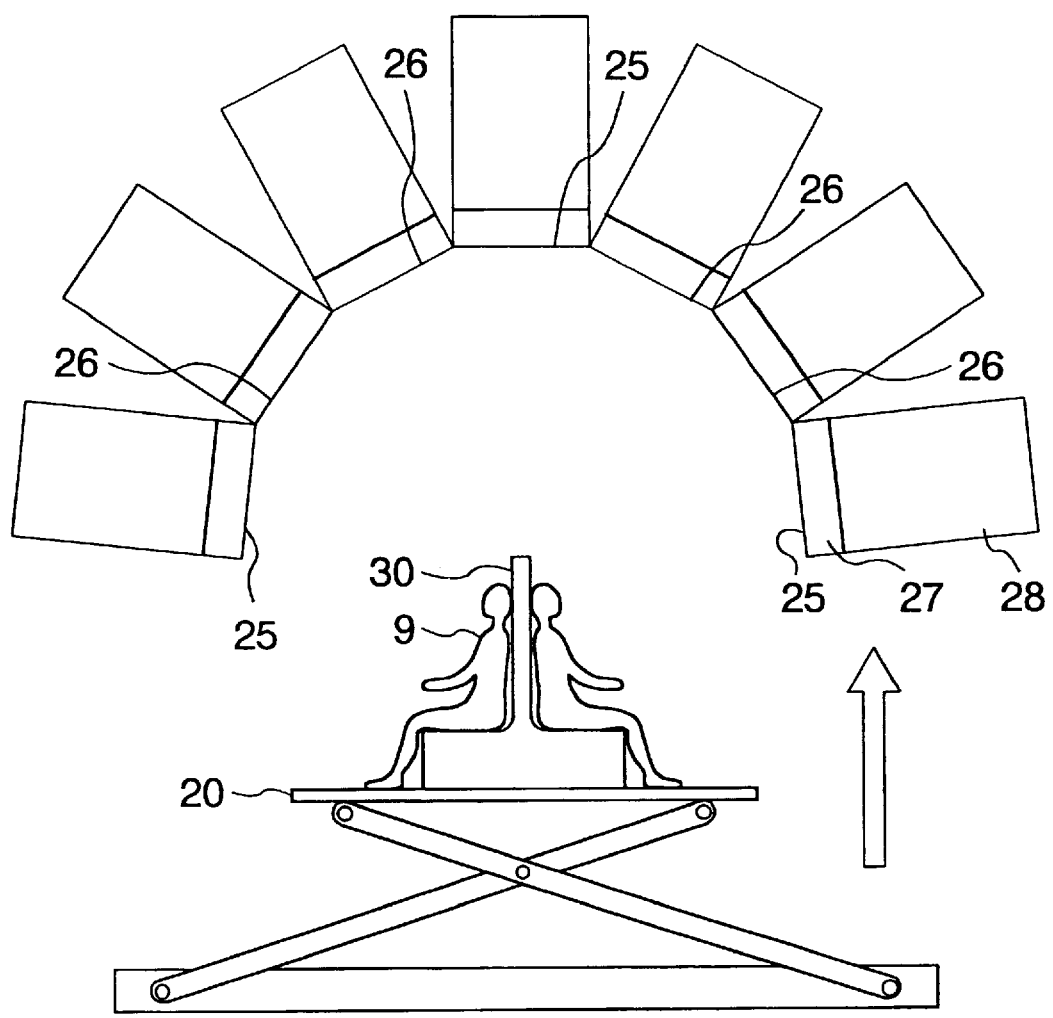
FIG. 13 is a vertical cross-sectional view illustrating the 5th embodiment of the rear projection-type multi-screen display apparatus of the invention.

FIG. 13 is a schematic, vertical cross-sectional view which shows the rear projection-type multi-screen display apparatus of this embodiment. As shown in this Figure, a floor 20 on which viewer's seats 30 are mounted can be lifted from the lower side into the dome.

The operation of the rear projection-type multi-screen display apparatus of this embodiment will now be described. Image light, emitted from the projection device of each of the rear projection-type display devices, passes through the transmission screen to reach the viewer. At this time, the viewer can watch the picture image extending in right, left and upper directions over the entire area.

As described above, the rear projection-type multi-screen display apparatus of this embodiment can provide the picture image which achieves the wide visibility angle, and provides the enhanced realism as in the above embodiments. Besides, with this multi-screen system, sufficient brightness and fineness can be achieved.

The rear projection-type multi-screen display apparatus of this embodiment can provide the picture image which has the wide visibility angle not interrupted in the right-left direction and in the upward direction, and achieves the more enhanced realism. Since the dome configuration has a shape close to a spherical shape, the viewing position can be located close to a line normal to the central portion of each of the transmission screens, and the dome-shaped image can be achieved with the two kinds of screens, that is, the regular pentagonal screens and the regular hexagonal screens. Furthermore, since the entrance/exit is provided at the lower side of the display apparatus, the viewers standing at respective predetermined positions can hardly see the entrance/exit, and therefore the realism is further enhanced.

Although the display apparatus of this embodiment, constituted by the 16 rear projection-type display devices, has a pseudo semi-spherical construction, the invention is not limited to such a construction, and the number of rear projection-type display devices can be increased or decreased.

In this embodiment, the viewer's seats are lifted from the lower side into the dome, and this construction can be applied to other embodiments of the invention directed to dome-shaped, rear projection-type multi-screen display apparatuses, in which case since the viewer standing at a predetermined position can not see the exit as in this embodiment, the realism is enhanced.

6th Embodiment

A sixth embodiment of the present invention will now be described with reference to FIGS. 14 and 15.

Figure 14:
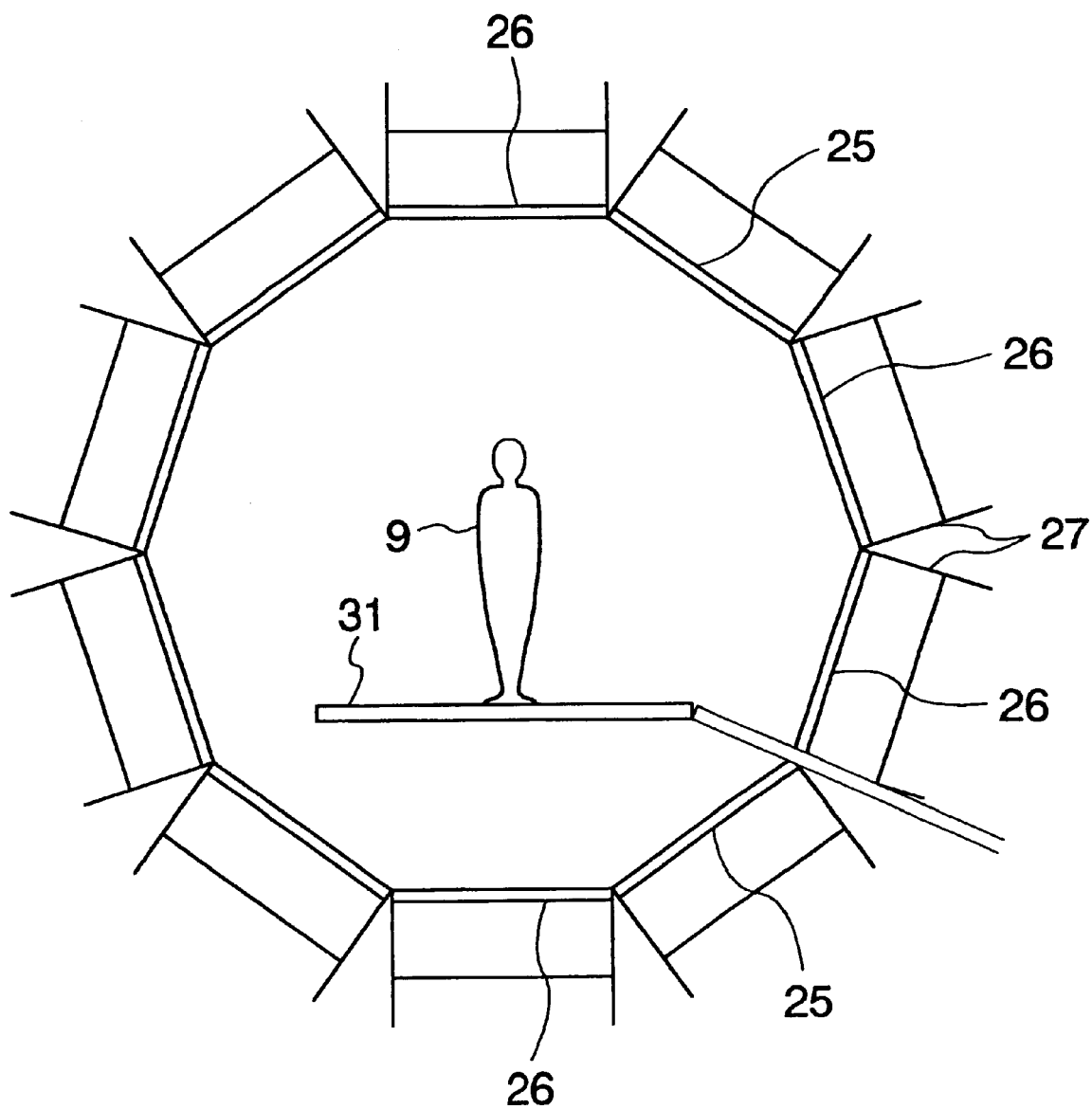
FIG. 14 is a vertical cross-sectional view showing a screen structure of a 6th embodiment of a rear projection-type multi-screen display apparatus of the invention.

FIG. 14 is a schematic, vertical cross-sectional view which shows the six embodiment of a rear projection-type multi-screen display apparatus of the invention. In this Figure, a screen structure is mainly shown, and for illustration purposes the projection devices and so on are omitted from the figure.

The screen surface of the rear projection-type multi-screen display apparatus of this embodiment has a shape circumscribed by a spherical surface, and is defined by a soccer ball-like 32-surface construction (having 12 plane surfaces of a regular pentagonal shape and 20 plane surfaces of a regular hexagonal shape; a so-called truncated icosahedron) obtained by using 12 rear projection-type display devices each having a transmission screen of a regular pentagonal shape and 20 rear projection-type display devices each having a transmission screen of a regular hexagonal shape. Each side of each regular pentagonal transmission screen 25, as well as each side of each regular hexagonal transmission screen 26, has a length of 20 inch, and the diameter of the spherical construction is about 4 m, and therefore this spherical construction has a sufficient space to enable one to four viewers to watch a picture image over the entire circumference in a right-left direction and a vertical direction.

As shown in FIG. 14, in the rear projection-type multi-screen display apparatus of this embodiment, a transparent floor 31 on which the viewer 9 stands is provided within the spherical screen, and this floor 31 is laid at a level above the bottom of the screen. The transparent floor 31 comprises a light-transmitting member of tempered glass or the like, and a frame of metal or the like holding this light-transmitting member.

Figure 15:
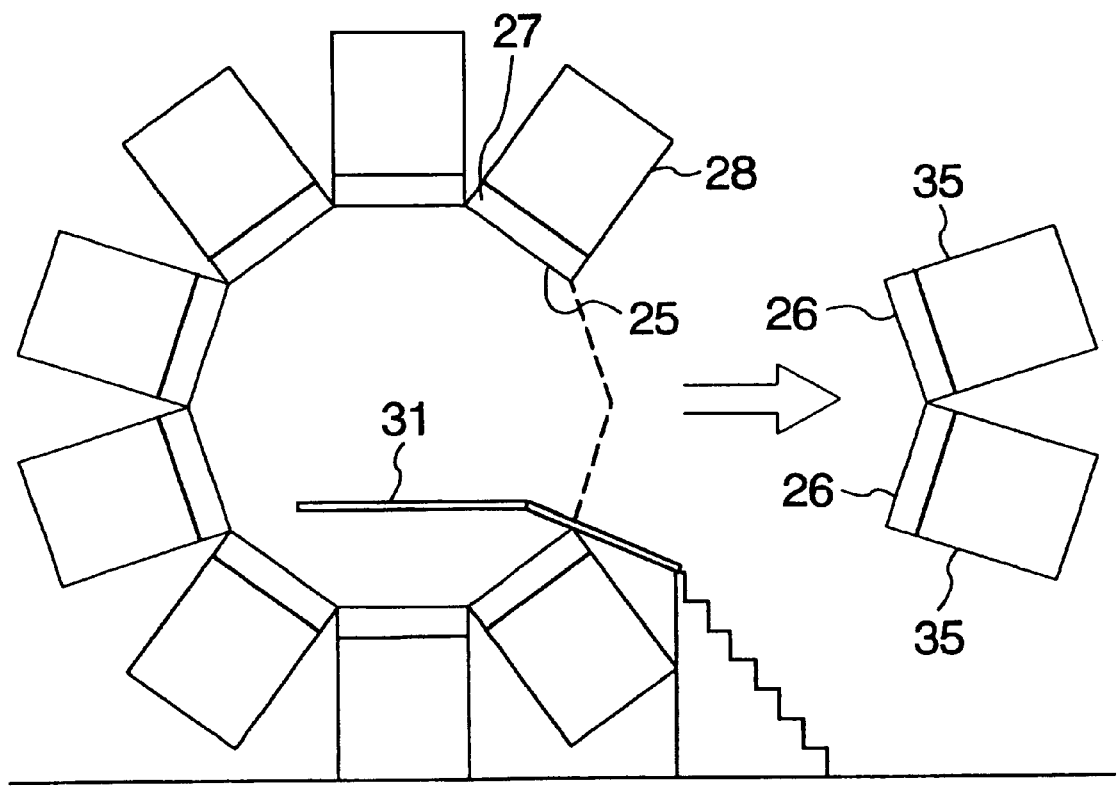
FIG. 15 is a vertical cross-sectional view illustrating the 6th embodiment of the rear projection-type multi-screen display apparatus of the invention, with two rear projection-type display devices displaced to form an entrance/exit.

FIG. 15 is a vertical cross-sectional view of the rear projection-type multi-screen display apparatus of this embodiment. As shown in this Figure, those two vertically-adjacent rear projection-type display devices 35 (each having the transmission screen 26 of a regular hexagonal shape) which are disposed at a lateral side of the spherical dome are movable outwardly. The two rear projection-type display devices, serving as movable units, are moved outwardly to provide an entrance/exit for the viewer, as shown in FIG. 15.

The operation of the rear projection-type multi-screen display apparatus of this embodiment will now be described. Image light, emitted from the projection device of each of the rear projection-type display devices, passes through the transmission screen to reach the viewer. At this time, the above-mentioned entrance/exit is closed by the movable rear projection-type display units 35, and therefore the viewer can watch the picture image extending 360° over the entire circumference. Further, the viewer can also watch the picture image below his foot through the transparent floor 31.

As described above, the rear projection-type multi-screen display apparatus of this embodiment can provide the picture image which achieves the wide visibility angle, and provides the enhanced realism as in the above embodiments. Besides, with this multi-screen system, sufficient brightness and fineness can be achieved.

In the rear projection-type multi-screen display apparatus of this embodiment, the entrance/exit is closed by the rear projection-type display devices 35, and therefore the display apparatus can provide the picture image which achieves the wide visibility angle of 360° over the entire circumference, and provides the extremely enhanced realism. Further, the viewer can watch not only the picture image in the upward and right-left directions but also the picture image beneath the viewer, and therefore the viewer feels as if he were floating in the air. Furthermore, since the dome-shape is very close to a spherical shape, the viewing position can be located close to a line normal to the central portion of each of the transmission screens, and therefore the natural dome-shaped image can be achieved by the use of the transmission screens of a regular pentagonal shape and the transmission screens of a regular hexagonal shape.

Although this embodiment has been directed to the polygonal construction constituted by 32 side surfaces including the regular pentagonal surfaces and the regular hexagonal surfaces, the transparent floor and the movable rear projection-type display devices in this embodiment can be applied to other rear projection-type multi-screen display apparatuses, in which case similar effects as achieved in this embodiment can be attained.

There may be used an arrangement in which a plurality of triangular transmission screens are combined together to form a regular icosahedral surface or part of it, and a dome-shaped screen is formed by a pseudo spherical surface defined by this icosahedral surface or part thereof.

In each of the above embodiments, although the concave overall screen of a dome-shape or the like are constituted by combining the plurality of planar transmission screens into a pseudo spherical shape defined by a plurality of surfaces, or part thereof. The concave overall screen constituted by a plurality of surfaces may be formed into a pseudo ellipsoidal shape defined by the plurality of surfaces (defined respectively by planar transmission screens), or part thereof. Alternatively, the concave overall screen may be formed into a pseudo shape generally equal to a shape generated by revolving a constant curved line (generating line) about an axis, or part thereof.

7th Embodiment

A 7th embodiment of the present invention will now be described with reference to FIGS. 16 to 18.

Figure 16:
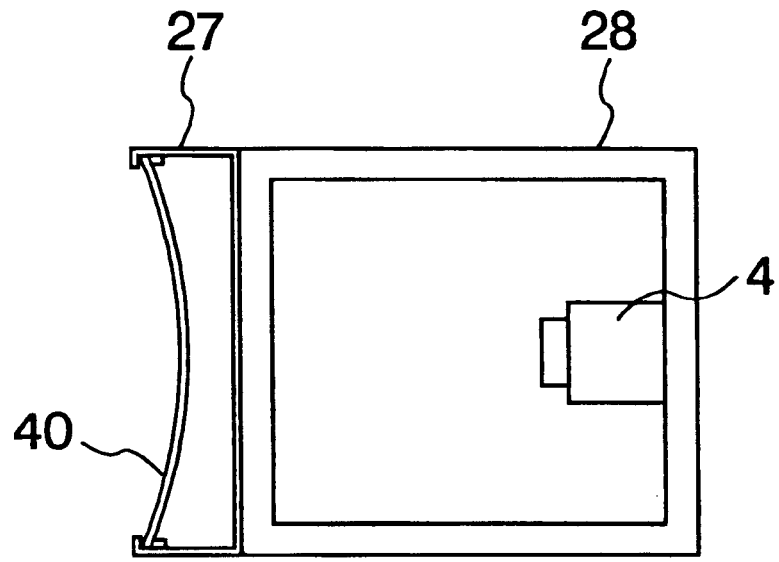
FIG. 16 is a vertical cross-sectional view illustrating a rear projection-type display device used in a 7th embodiment of a rear projection-type multi-screen display apparatus of the invention.

FIG. 16 is a vertical cross-sectional view which shows a rear projection-type display device used in the 7th embodiment of a rear projection-type multi-screen display apparatus of the invention. A dome-shape of the rear projection-type multi-screen display apparatus of this embodiment is defined by a part of a dodecahedron, and is constituted by the combination of transmission screens of the same configuration. Each of the transmission screens has a generally pentagonal, projected shape when viewed from the front side.

As shown in FIG. 16, the rear projection-type display device in this embodiment has the concave screen 40 which is three-dimensionally curved concavely as viewed from the viewer side.

Figure 17:
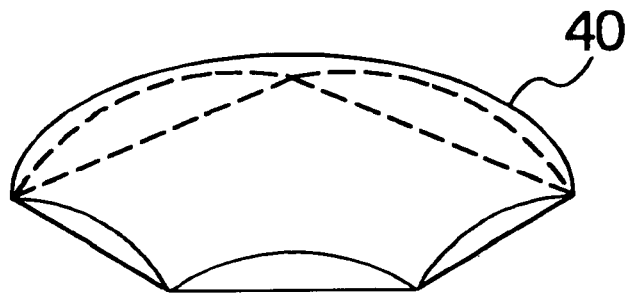
FIG. 17 is a perspective view illustrating a transmission screen (concave screen) used in the rear projection-type display device in the 7th embodiment.

FIG. 17 is a perspective view which shows the transmission screen (concave screen) 40 of the rear projection-type display device in this embodiment. As shown in this Figure, the three-dimensionally curved surface of the concave screen 40 is equal in curvature to the overall screen of the rear projection-type multi-screen display apparatus, and has a geodesic regular pentagonal shape, with its sides disposed on the curved surface.

Figure 18:
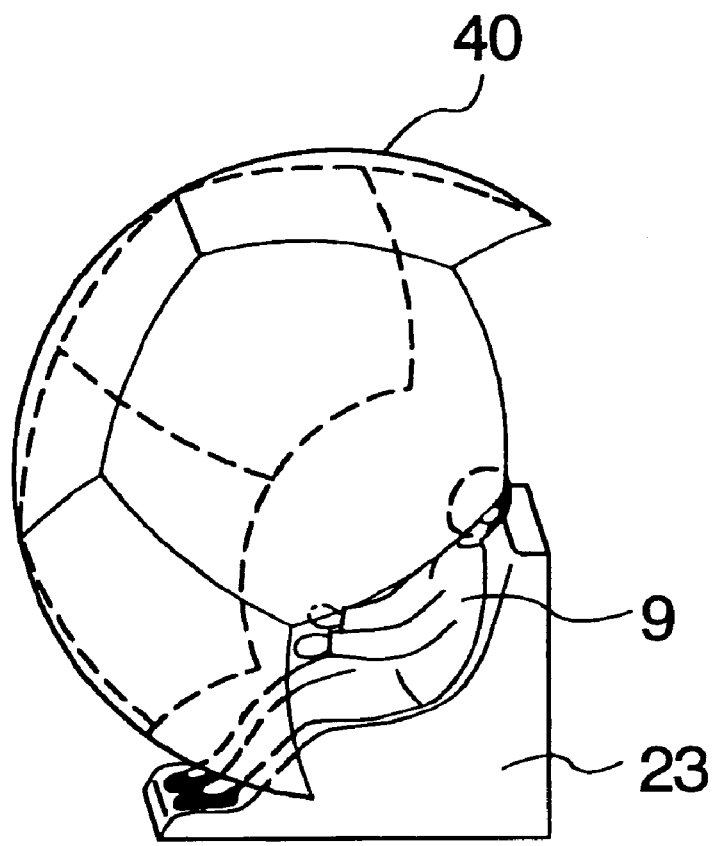
FIG. 18 is a perspective view showing a screen structure of the 7th embodiment of the rear projection-type multi-screen display apparatus of the invention.

FIG. 18 is a perspective view showing a screen structure of the rear projection-type multi-screen display apparatus of this embodiment which is constituted by the combination of 6 concave screens 40 mentioned above. In this Figure, for better understanding of the screen structure, the projection devices, screen support structures and so on are omitted from this figure. In this embodiment, the curved surface of the overall screen of the rear projection-type multi-screen display apparatus is formed by the combination of the three-dimensionally curved surfaces of the transmission screens (concave screens) 40, and each of the transmission screen (concave screens) 40 has a geodesic regular pentagonal shape as described above.

The operation of the rear projection-type multi-screen display apparatus of this embodiment will now be described. Image light, emitted from the projection device of each of the rear projection-type display devices, passes through the transmission screen to reach the viewer. The central directivity of the intensity of the image light going out from the transmission screen always coincides with a line normal to the transmission screen at this light-outgoing position. In this embodiment, the screens are joined together that the overall screen is smoothly curved with no corners and nookes at the joint between any two adjacent screens.

As described above, the rear projection-type multi-screen display apparatus of this embodiment can provide a picture image which achieves a wide visibility angle, and provides the enhanced realism as in the above embodiments. Besides, with this multi-screen system, sufficient brightness and fineness can be achieved.

In the rear projection-type multi-screen display apparatus of this embodiment, the transmission screens (concave screens) 40 are so joined together that the overall screen is smoothly curved with no corners and nookes at the joint between any two adjacent screens 40, and therefore the picture images on the respective screens 40 are combined together in such a natural manner as not to make the viewer conscious of the multi-screen. Therefore, there is provided the display system which can simulate the enhanced realism.

In this embodiment, although the transmission screens (concave screens) 40 each having the three-dimensionally curved surface of a geodesic regular pentagonal shape (obtained when projecting a plane regular pentagonal shape on a spherical surface), as well as the rear projection-type multi-screen display apparatus using these transmission screens, have been described, similar effects can be achieved by the use of transmission screens of any other suitable geodesic shape such as a regular hexagonal shape, a rectangular shape and a trapezoidal shape.

More specifically, it is clear that a screen analogous to that of the first embodiment can be formed by the combination of the transmission screens, each having a three-dimensionally curved surface of a geodesic square shape (obtained by convexly forming a planar regular rectangular shape into a spherical surface), with transmission screens each having a three-dimensionally curved surface of a geodesic square shape (obtained by convexly forming a planar trapezoidal shape into a spherical surface). Also, it is clear that a screen analogous to that of the second embodiment or that of third embodiment can be formed by the combination of three kinds of transmission screens respectively having three kinds of three-dimensionally curved surfaces of a geodesic square shape (respectively obtained by convexly forming three kinds of planar trapezoidal shapes into spherical shapes). It is clear that a screen analogous to that of the 4th embodiment or that of the 5th embodiment can be formed by the combination of transmission screens, each having a three-dimensionally curved surface of a geodesic pentagonal shape (obtained by convexly forming a planar regular pentagonal shape into a spherical surface), with transmission screens each having a three-dimensionally curved surface of a geodesic hexagonal shape (obtained by convexly forming a planar regular hexagonal shape into a spherical surface). It is clear that a dome-shaped screen can be formed by using a pseudo icosahedral surface (or a part of it) defined by the combination of the transmission screens each having a three-dimensionally curved surface of a geodesic regular triangular shape (obtained by convexly forming a planar regular triangular shape into a spherical surface).

In the case where there are used the transmission screens having the three-dimensionally curved surface of a geodesic polygonal shape, the dome-shaped screen can be formed not only by a spherical surface or part thereof, but also by an ellipsoidal surface or a part thereof, or a shape generally equal to a shape generated by revolving a constant curved line (generating line) about an axis or a part thereof.

In the case where there are used the transmission screens having a three-dimensionally curved surface of a geodesic polygonal shape, the three-dimensionally curved surface of the transmission screen may not have an accurate geodesic polygonal shape because of limitations or restraints by manufacturing technique. In such a case, the resulting screen has a dome-shape close or analogous in curvature to a spherical surface or an ellipsoidal shape (for example, the dome-shaped screen has a regular dodecahedral shape close to a spherical surface, a regular icosahedral shape or the like).

As each of the rear projection-type display devices of the rear projection-type multi-screen display apparatuses having the respective screen structures of the invention described above and later, a screen unit, employing a lenticular lens sheet as in the conventional construction, may be used, or a screen unit as described later for a 10th embodiment of the invention may be used. As the projection device in each of the rear projection-type display devices of the rear projection-type multi-screen display apparatuses having the respective screen structures of the invention described above and below, the projection device, in which R, G and B projection elements are arranged in an inline manner as in the conventional construction, may be used, or a projection device as described later for the 10th embodiment may be used.

8th Embodiment

An 8th embodiment of the invention will now be described with reference to FIG. 19.

FIG. 19 is a cross-sectional view which shows an important portion of the 8th embodiment of a rear projection-type multi-screen display apparatus of the invention. A rear projection-type display device of the rear projection-type multi-screen display apparatus of this embodiment comprises a transmission screen (rectangular screen) 41, and a screen support frame 42 supporting the transmission screen 41. The screen support frame 42 is of a truncated pyramid-shaped (here a truncated hollow pyramid having a square base), hollow construction decreasing in size or cross-sectional area progressively from its rear side toward its front side at which a screen mounting portion is provided. The four sloping sides of the truncated pyramid are inclined at an angle of 75° with respect to its base defining the rear surface. In this embodiment, the transmission screen 41 can be removed by pushing it into the rear projection-type display device, and the transmission screen 41 can be fixed to the screen support frame 42 by a fixing member (not shown). In FIG. 19, reference numeral 43 denotes a unit support frame supporting the screen support frame 42.

In the rear projection-type multi-screen display apparatus of this embodiment, the adjacent transmission screens 41 make an angle of 30° with respect to each other.

The operation of the rear projection-type multi-screen display apparatus of this embodiment will now be described. In this embodiment, even when the plurality of transmission screens are mounted in a downwardly inclined manner, there is little possibility that the rear projection-type display devices are displaced inwardly or downwardly since the screen support frames 42 of the adjacent rear projection-type display devices are held in surface-to-surface contact with each other. This provides the firm structure. When the transmission screen is to be removed for the maintenance of a projection device or for other purposes, there is little possibility that the screen drops since the screen is not removed in a downward direction.

As described above, in this embodiment, even when the transmission screen surfaces are directed downwardly so as to overhang the viewer, there is obtained the support frame structure which is not dangerous, and is firm.

9th Embodiment

A 9th embodiment of the present invention will now be described with reference to FIG. 20.

FIG. 20 is a cross-sectional view which shows an important portion of the 9th embodiment of a rear projection-type multi-screen display apparatus of the invention. A rear projection-type display device of the rear projection-type multi-screen display apparatus of this embodiment comprises a screen support frame 42 supporting a screen 41, a unit support frame 45 supporting the screen support frame 42, a projection device 4, a projection device support frame 46, and a connecting frame 47 connecting the projection devices 46 together. The screen support frame 42 is supported by the unit support frame 45, and accordingly an assembly composed of the screen support frames 42 and the unit support frames 45 can be self-sustained. The projection device 4 is mounted on the unit support frame 45 through the projection device support frame 46 from the outer side, and the adjacent projection devices 4 are interconnected by the connecting frame 47. The adjacent unit support frames 45 are interconnected in an assembled condition, and the adjacent screen support frames 42 are interconnected through the assembly of the unit support frames 45.

The operation of the rear projection-type multi-screen display apparatus of this embodiment will now be described. For assembling the rear projection-type multi-screen display apparatus of this embodiment, the unit support frames 45 are first assembled together, and then the screen support frames 42 are mounted on the unit support frames 45, thereby forming a dome-shaped screen. Then, each projection device 4 is mounted on the unit support frame 45 through the projection device support frame 46. Finally, the projection devices 4 are interconnected by the connecting frames 47.

As will be appreciated from the above description, in this embodiment, the projection devices 4, which are the heaviest in weight among the component parts of the system, are mounted on the unit support frames 45 after the screens are mounted on the unit support frames 45, and by doing so, the display apparatus can be assembled more easily. By interconnecting the projection devices 4, the more firm structure can be obtained.

10th Embodiment

A 10th embodiment of the present invention will now be described with reference to FIGS. 21 to 23.

FIG. 21 is a perspective view which shows an important portion of a transmission screen of a rear projection-type display device of a rear projection-type multi-screen display apparatus according to the 10th embodiment. The transmission screen of this embodiment consists of two sheets, that is, a Fresnel sheet 50 and a microlens sheet 51. The Fresnel lens sheet 50 has a Fresnel lens formed on its light-outgoing surface 53 as shown in FIG. 21, and its light-incident surface 52 is planar. The microlens sheet 51 has a plurality of oval microlens lenses formed on its light-incident surface 54, and these microlenses are arranged consecutively in rows and columns, that is, in horizontal and vertical directions of the screen. Each of these microlenses has its second focal position disposed on a light-outgoing surface 55 of the microlens sheet 51. A grid-like light-absorbing portion 56 (defined by crossed elongate portions each having a predetermined width) is formed on the light-outgoing surface 55, and a plurality of oval microlens are also formed on the light-outgoing surface 55, and are disposed respectively in openings in the grid-like light-absorbing portion 56, each of these microlenses having its second focal position disposed on the light-incident surface 54. The light-absorbing portion 56 and the microlens on the light-outgoing surface 55 of the microlens sheet 51 are substantially equal in width in both horizontal and vertical directions of the screen, and therefore the area ratio of the light-absorbing portion 56 to the overall light-outgoing surface 55 is 75%. The convex microlenses may be of a non-spherical shape close to an oval shape.

The applicants experimented and studied for determining the above-mentioned area ratio of the light-absorbing portion 56 to the overall front viewing surface 55, and found as follows:

(1) the smaller the thickness of the transmission screen or the rear projection type screen, that is, the shorter the distance between the rear projection surface and the front viewing surface of the screen, the larger the light volume transmitted from the rear projection surface to the front viewing surface or the more the deterioration of the contrast: and (2) the higher the transmissivity of the screen, the greater the diffusion of external light in the screen, that is, greater the volume of external light reflected from the front viewing surface to the viewer or the more the deterioration of the contrast.

For example, the experiments were conducted with the use of an arrangement in which two screens, a front screen and a rear screen, were arranged in parallel with each other, and a black color image was projected onto the front screen while a white color image was projected onto the rear screen so that light from the rear screen was incident upon the front screen as external light. The contrasts of the screens were measured with the following conditions:

the distance between the screens: 3 m, and the transmissivity of the screens: 40%.

Thus, the following results were obtained:

| Area ratio of Light Absorbing Portion | Contrast Ratio |
| --- | --- |
| 0% | 40 |
| 40% | 70 |

Further, it was found that the contrast ratio of 70 could provide a satisfactory image.

Thus, it is found that the area ratio of the light absorbing portion to the overall front viewing surface is preferably higher than 40%.

FIG. 22 is a front-elevational view which shows an important portion of a projection device of the rear projection-type display device of the rear projection-type multi-screen display apparatus of this embodiment. The projection device in this embodiment comprises three projection-type CRTs 61, 62 and 63 for respectively projecting red (R), green (G) and blue (B) images, three projection lenses 60, and a bracket 64 connecting the projection-type CRTs to the respective projection lenses 60.

The R projection-type CRT 62 and B projection-type CRT 63 are juxtaposed in parallel relation to each other, and the G projection-type CRT 60 is disposed above the juxtaposed CRTs 62 and 63, and lies on a line disposed intermediate the juxtaposed CRTs 62 and 63. The three projection lenses 60 are disposed at central portions of the three projection-type CRTs 61, 62 and 63, respectively. Therefore, the three projection lens 60 are disposed at vertexes of an isosceles triangle, respectively. The single bracket 64 of a unitary construction connects the three (R, G and B) projection-type CRTs to the respective projection lenses 60.

The operation of the transmission screen as well as the operation of the projection device in this embodiment will now be described. Image light, emitted from the projection device, is converted into generally parallel rays of light by the Fresnel lens sheet 50. Then, the light is condensed on the microlens on the light-outgoing surface 55 of the microlens sheet 51 by the microlens on the light-incident surface 54, and is diffused, and goes out from the transmission screen. At this time, the image light is condensed only on the microlens on the light-outgoing surface 55, thereby keeping a loss of the image light at a low level. External light reflection (surface reflection) (which is a phenomenon in which external light is incident on and is reflected by the screen surface to thereby lower the contrast of the picture image) is 25% of that obtained without the light-absorbing portion 56, since the reflectance of the light-absorbing portion 56 is extremely low, and can be regarded as almost zero. This surface reflection is reduced to 50% of that obtained with the conventional lenticular lens sheet.

Figure 23:
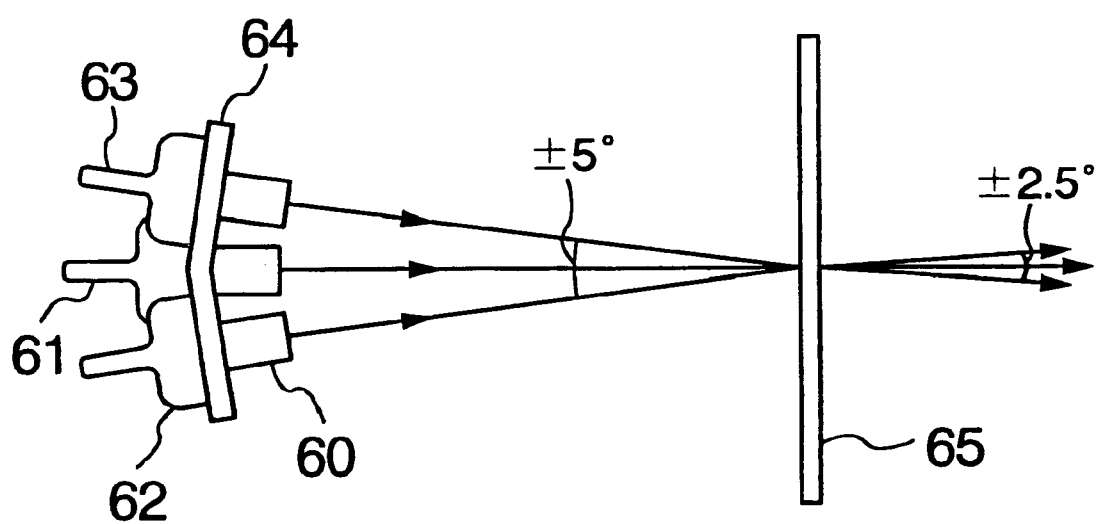
FIG. 23 is a view showing an optical system of the projection device used in the rear projection-type display device of the 10th embodiment of the rear projection-type multi-screen display apparatus of the invention.

FIG. 23 is a schematic, horizontal cross-sectional view of the optical system comprising the projection devices and the transmission screen in this embodiment. As shown in this Figure, the R, G and B projection lens (projection-type CRTS) in this embodiment are disposed at the vertexes of the isosceles triangle, respectively. With this arrangement, the R and B projection-type CRTs 61 and 63 are disposed adjacent to each other, so that the distance between their projection lens is a half of that in the conventional construction, and the converging angle is reduced to a half. Image light beams, emerging respectively from the R and B projection lenses, are incident on the transmission screen 65 at an angle of ±5°. Then, the image light is converted into generally parallel rays of light by the microlens on the light-outgoing surface 55 of the microlens sheet 51. At this time, the main optical axes of the R and B light beams are not converted into completely parallel relation to each other, and the angles at which the most intense light beams go out from the transmission screen deviate about ±2.5° from a line normal to the transmission screen. However, in this embodiment, light-directivity characteristics are reduced about 5° as compared with the conventional projection device of the inline type.

As is clear from the above description, in this embodiment, the projection device can be reduced in width, thereby achieving a compact design, and besides by the use of the unitary bracket 64, the projection device can be lightweight. By reducing the difference in light directivity between the R, G and B image light beams, a color change at the joint portions of the display, which is caused by color shift, can be reduced to 50% of that in the conventional construction. Furthermore, the surface reflection on the screen can be reduced to a half of that in the conventional construction, thereby improving the contrast of the picture image.

11th Embodiment

An eleventh embodiment of the present invention will now be described with reference to FIGS. 24 to 27.

Figure 24:
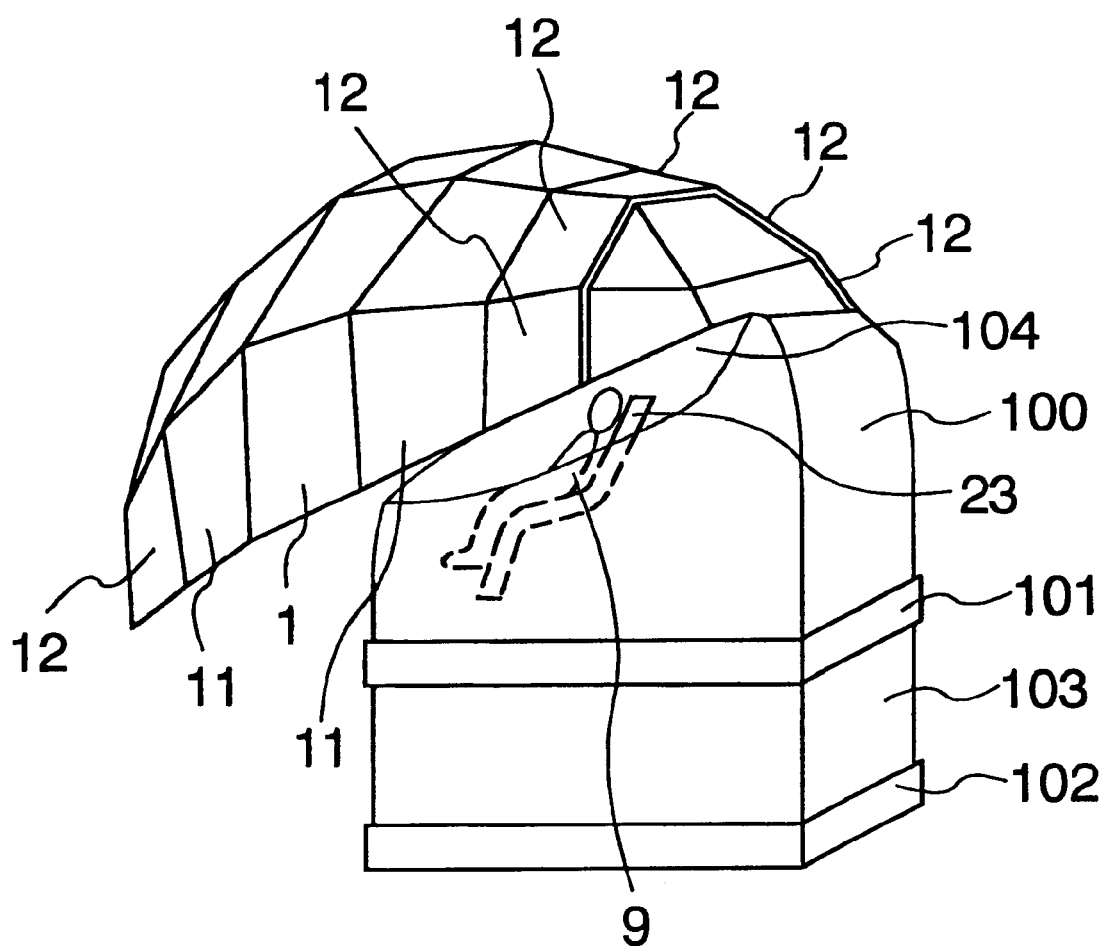
FIG. 24 is a perspective view illustrating a 11th embodiment of a display system of the invention.
Figure 25:
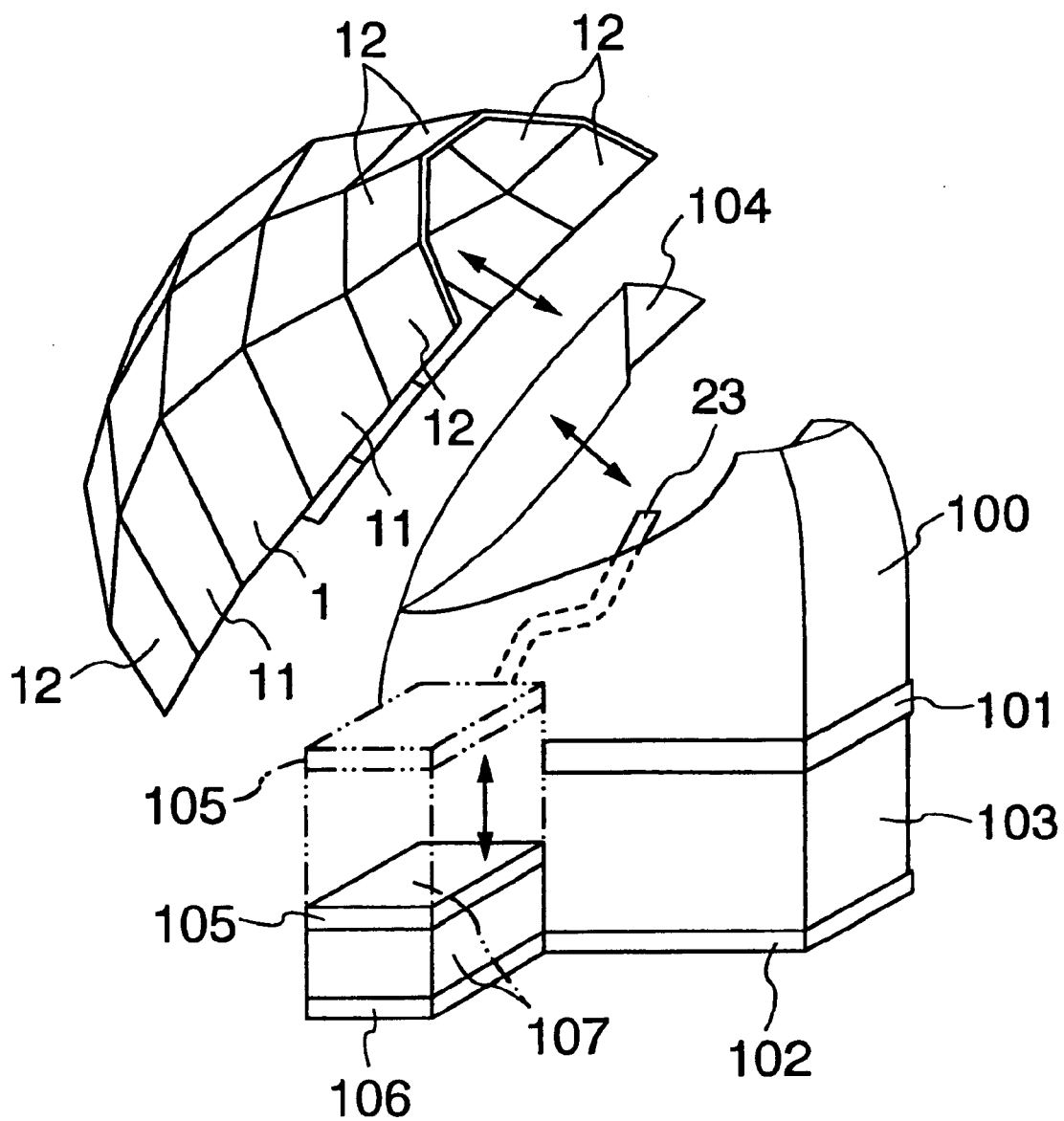
FIG. 25 is a view showing how the viewer gets on an off a simulation vehicle device of the 11th embodiment of the display system.
Figure 26:
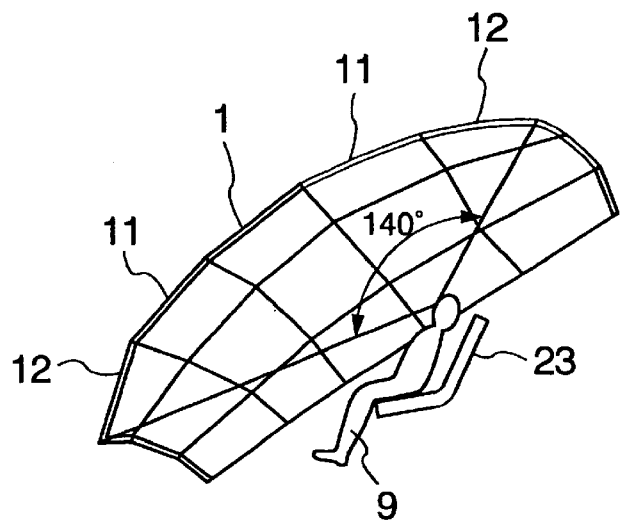
FIG. 26 is a vertical cross-sectional view showing a rear projection-type multi-screen display apparatus used in the 11th embodiment of the display system of the invention.

FIG. 24 is a perspective view of an important portion of a display system according to the 11th embodiment of the invention. In FIGS. 24, 25 and 26, for better understanding of a screen structure of a rear projection-type multi-screen display apparatus of the system of this embodiment, the projection devices, screen support structures and so on are omitted from these figures.

The rear projection-type multi-screen display apparatus used in the display system of this embodiment comprises rear projection-type display devices arranged in 5 rows and 5 columns. The rear projection-type display devices in each of the uppermost and lowermost rows have respective transmission screens 12 of a trapezoidal shape, and the rear projection-type display devices in each of the second rows from the top and bottom have respective transmission screens 11 of another kind of trapezoidal shape. The rear projection-type display devices in the central row have respective transmission screens 1 of a rectangular shape.

In FIG. 24, reference numerals 9 and 23 respectively denote the viewer and a viewer's seat as described above, reference numeral 100 a simulation vehicle device, reference numeral 101 a motion ride, reference numeral 102 a fixed base, reference numeral 103 a moving device, and reference numeral 104 a transparent door for closing an entrance/exit of the simulation vehicle device 100 trough which the viewer 9 gets on this vehicle device 100.

The simulation vehicle device 100 gives the realism to the viewer such that the viewer feels as if he were on an actual vehicle. The simulation vehicle device 100 has a lightweight design except those portions thereof which do not handle the viewer 9. The simulation vehicle device 100 is mounted on the motion ride 101 so that motion is imparted to this vehicle device 100. The motion ride 101 is mounted on the moving device 103 mounted on the fixed base 102 fixedly mounted on a floor, and this moving device 103 imparts motion. The moving device 103 is operated in accordance with an instruction from a motion control CPU, and is moved in six modes (that is, pitching, rolling, yawing, heaving, swaying and surging).

FIG. 25 is a schematic view showing how the viewer gets on and off the display system of this embodiment employing the rear projection-type multi-screen display apparatus. As shown in this Figure, the viewer's seat 23 is provided inside of the entrance/exit door 104. The whole of the rear projection-type multi-screen display apparatus is rotated or turned upwardly, and then the door 104 is opened to enable the viewer to get on the vehicle apparatus. When the viewer is to get off the simulation vehicle device 100, an operation reverse to the above is effected.

Since the motion ride 101 is mounted on the moving device 103, the entrance/exit of the simulation vehicle device 100 is at a level much higher than the floor surface. Therefore, when the viewer is to get on the simulation vehicle device 100, the viewer 9 stands on a boarding step 105, and then this boarding step 105 is lifted by an elevator device 107 to a position close to the entrance/exit, and the viewer 9 is seated on the viewer's seat 23. Then, the boarding step 105 is lowered by the elevator device 107 to a position where the boarding step 105 will not interfere with the moving device 103 when the moving device 103 is operated. When the viewer 9 is to get off the simulation vehicle device 100, an operation reverse to the above is effected.

Reference is now made to the operation of the rear projection-type multi-screen display apparatus used in the display system of this embodiment. The operation of the rear projection-type multi-screen display apparatus in this embodiment is generally similar to that described above in detail for the second embodiment, and therefore detailed description thereof will be omitted here.

FIG. 26 is a vertical cross-sectional view of an important portion of the display system of this embodiment. The rectangular screens 1 and the trapezoidal screens 11 and 12 of the rear projection-type multi-screen display apparatus are arranged to be inscribed in a spherical shape having a radius of about 2.2 m, and the viewer's seat 23 is provided generally at the central portion of this sphere. Therefore, the overall screen overhangs the viewer 9, and when the viewer 9 seated on the viewer's seat 23 watches a picture image, a visibility angle of about 180° in a horizontal direction and a visibility angle of about 70° in each of upward and downward directions (vertical direction) are obtained.

Next, the construction and operation of the display system of this embodiment employing the above rear projection-type multi-screen display apparatus will now be described.

Figure 27:
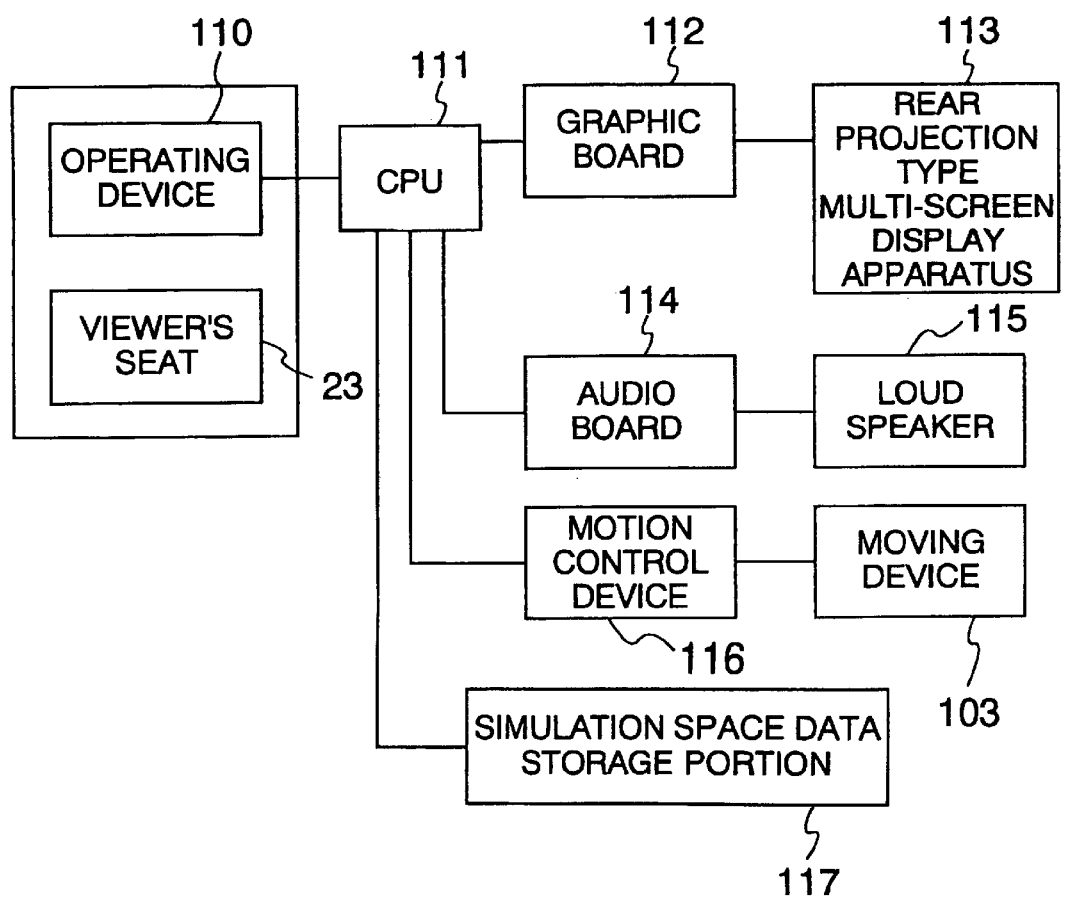
FIG. 27 is a block diagram showing a control system of the 11th embodiment of the display system of the invention.

FIG. 27 is a block diagram of an important portion of a control system of the display system of this embodiment. In this Figure, reference numeral 110 denotes an operating device provided in the simulation vehicle device 100. If the vehicle is, for example, a car, the operation device comprises a handle, an accelerator pedal, a change lever and so on. A CPU 111 of a central computer controls the overall system, and in response to detection signals from the operating device, the CPU 111 forms information concerning dynamic motion of the vehicle, and outputs it. The CPU 111 also produces information concerning a picture image and sound in accordance with the simulated motion. A graphic board 112 is responsive to the information from the CPU 111 for outputting a video signal to the display apparatus (the rear projection-type multi-screen display apparatus) 113. An audio board 114 is responsive to the information from the CPU 111 for outputting an audio signal to a loud speaker 115. A motion control device 116 comprises a CPU which is responsive to the information from the CPU 111 for effecting calculation, and a control device which is responsive to a control instruction from this CPU for directly controlling the moving device 103. The motion control device 116 receives an information signal concerning the dynamic motion (that is, representing the information necessary for calculating acceleration) from the CPU 111, and converts it into a signal for effecting the six modes of motion, and the moving device 103 is controlled by this conversion signal. A simulation space data storage portion 117 stores data representative of shapes, colors and sound of objects in the space in which the simulation vehicle device 100 is moved.

In the display system of the above construction according to this embodiment, the viewer 9 first takes the viewer's seat 23, and instructs the initiation of the operation of the system. As a result, the CPU 111 reads predetermined video and audio signals from a simulation space data storage part 117, and feed these signals to the graphic board 112 and the audio board 114, respectively, so that the picture image and sound are given to the viewer respectively through the display apparatus 113 and the loud speaker 115.

Then, in accordance with the thus given picture image and sound, the viewer 9 starts the operation of the simulation vehicle device 100. As a result, the detection signal concerning the motion of the vehicle device is fed to the CPU 111. In response to this signal, the CPU 111 calculates the dynamic motion of the vehicle, and feeds the information, representing the amount and direction of movement of the vehicle, to the motion control device 116. In response to the signal from the CPU 111, the CPU in the motion control device 116 calculates the acceleration (for example, angular acceleration in the rotating systems), and controls the moving device 103 in accordance with the direction and magnitude of the acceleration, thereby imparting a sense of acceleration to the viewer (that is, simulating the acceleration). In accordance with the information concerning the amount and direction of movement of the vehicle obtained through calculation of the dynamic motion of the vehicle, the CPU changes the visual point in the simulation space, and reconstructs the picture image and sound corresponding to the field of vision, and gives these to the viewer.

The viewer thus operates the simulation vehicle device 100 in a simulated manner, so that the viewer can experience the simulated motion of the simulation vehicle device 100 through the picture image, sound and acceleration. At this time, the rear projection-type multi-screen display apparatus of this embodiment can provide the picture image which achieves the wide field of vision, and gives the enhanced realism at a level equal to or more than that obtained with the rear projection-type multi-screen display apparatus of the 4th embodiment. Besides, with the multi-screen system, sufficient brightness and fineness can be achieved.

The rear projection-type multi-screen display apparatus of this embodiment is closer to a spherical shape than the display apparatus of the 1st embodiment, and therefore can provides the picture image giving the natural realism. The display apparatus of this embodiment is of such a construction that the picture image is extended to the ceiling, and therefore it can provide the picture image giving the more enhanced realism.

In this embodiment, although the moving device 103 is used for giving the sense of acceleration, the moving device 103 is not essential since the enhanced realism can be obtained only with the picture image.

Any of the rear projection-type multi-screen display apparatuses of the other embodiments of the invention other than the rear projection-type multi-screen display apparatus of FIGS. 24 to 26 can be used in the display system of this embodiment, and in such a case since the wide field of vision is provided, the enhanced realism can be achieved.

The simulation vehicle device is not limited to a car, and it may be a device without a power source, such as a skiing device and a hang glider device.

In this embodiment, although only the simulation vehicle device is moved, the system may be of such a construction that the multi-screen display apparatus is moved in coordinate relation to the simulation vehicle device.

With respect to the simulation vehicle device, only the viewer's seat may be moved, or instead the viewer's stand or the viewer's passage may be moved, in which case it is clear that the sense of acceleration can also be achieved.

It is not always necessary to provide only one simulation space, and a plurality of simulation spaces may be provided, in which case the viewer selects one of them.

In the case where a simulation space is shared by a plurality of display systems, CPUs of these display systems are connected together through communication means. In this case, the picture image of one display system can be displayed in the simulation space of another display system, and the motion of the picture image is analogous to human motion in contrast with that produced by a computer, and therefore the realism is enhanced. In this case, one or more additional display systems can be used.

12th Embodiment

Finally, a 12th embodiment of the present invention will now be described with reference to FIGS. 28 and 29.

Figure 28:
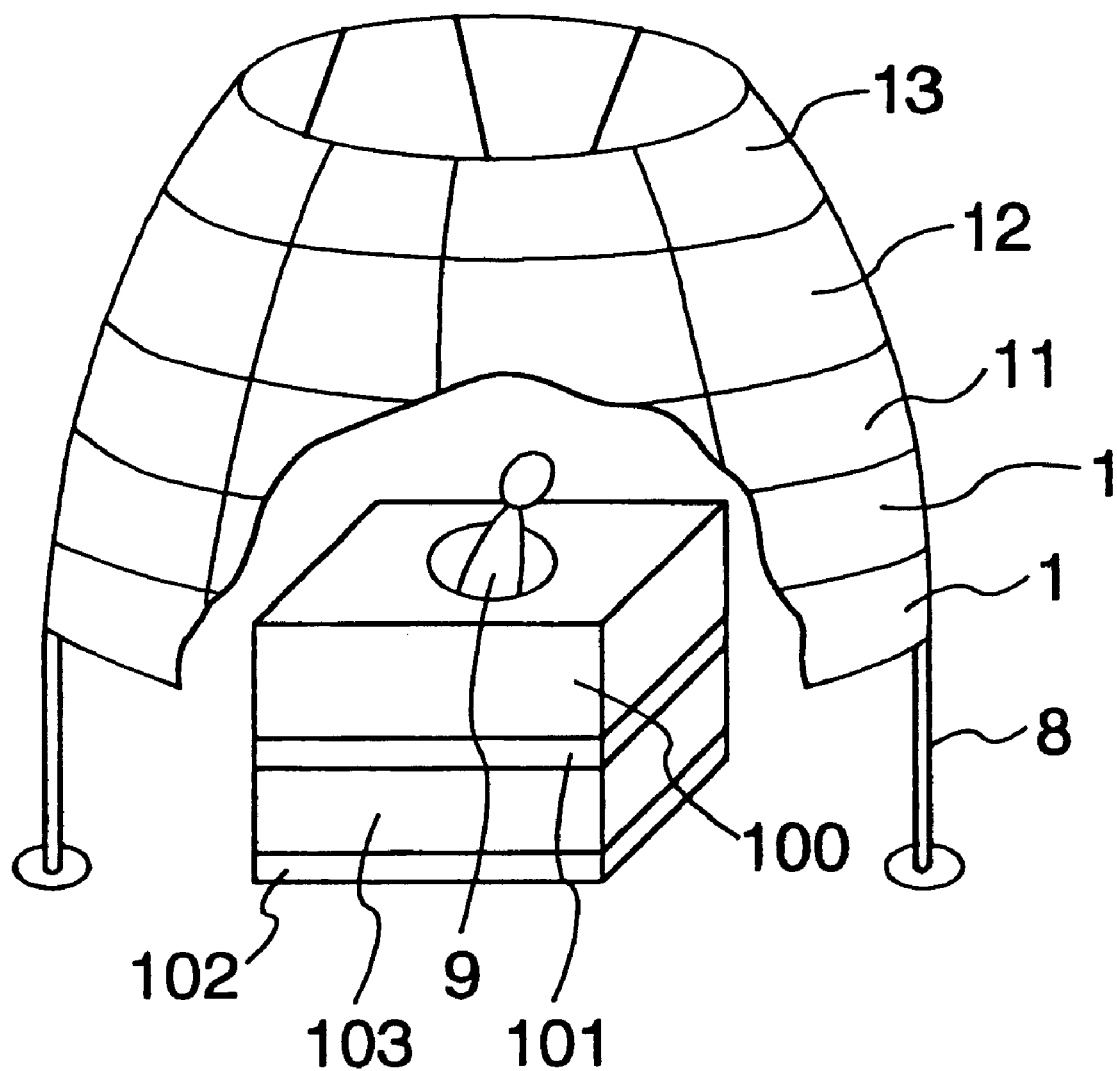
FIG. 28 is a partly-broken, perspective view illustrating a 12th embodiment of a display system of the invention.
Figure 29:
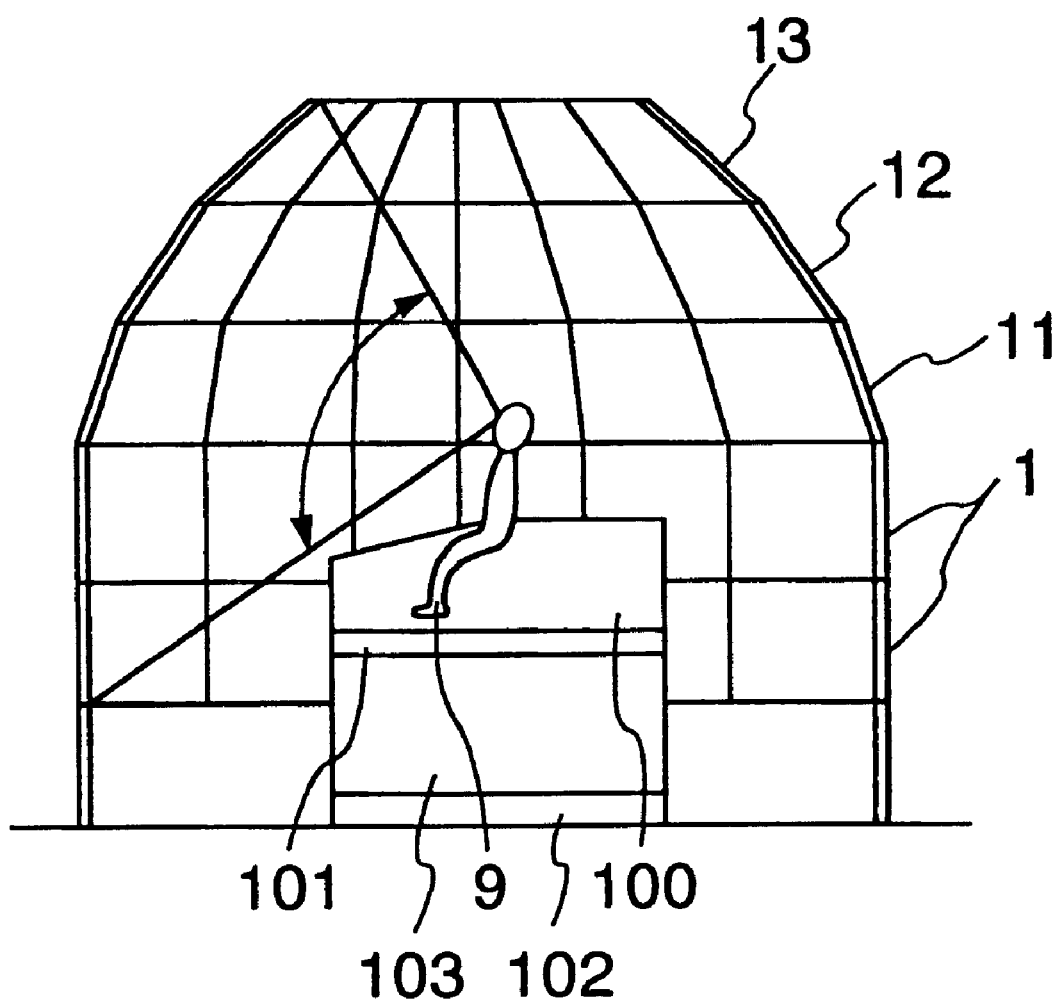
FIG. 29 is a vertical cross-sectional view illustrating the 12th embodiment of the display system of the invention.
Figure 30:
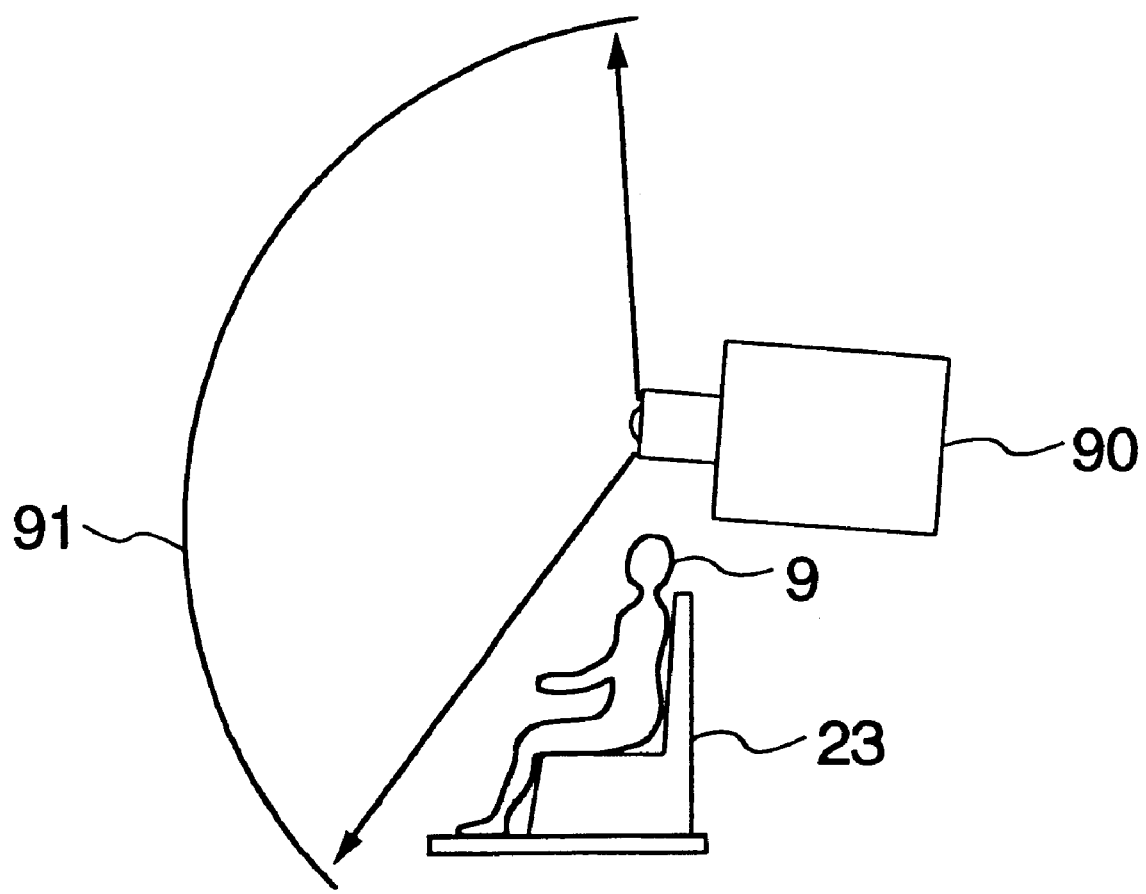
FIG. 30 is a view schematically showing a conventional front projection-type dome-shaped screen display device.
Figure 31:
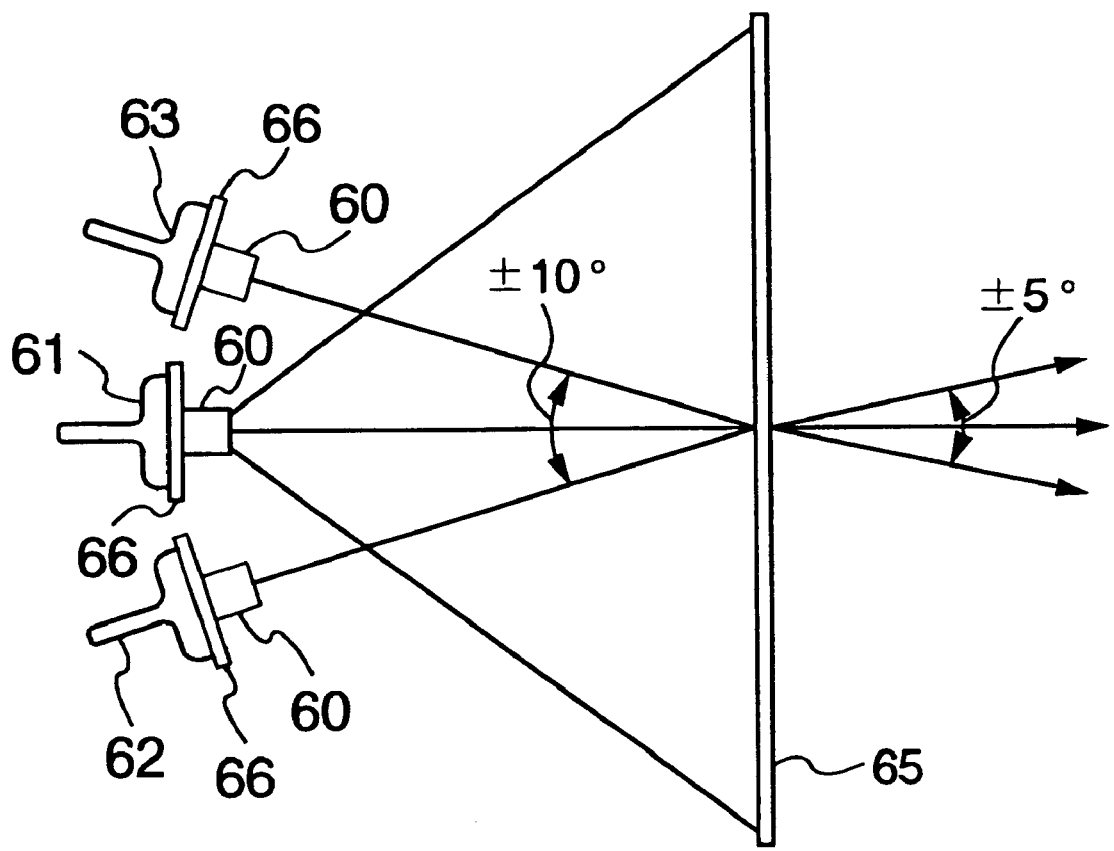
FIG. 31 is a horizontal cross-sectional view illustrating a projection optical system used in a conventional rear projection-type display device.
Figure 32:
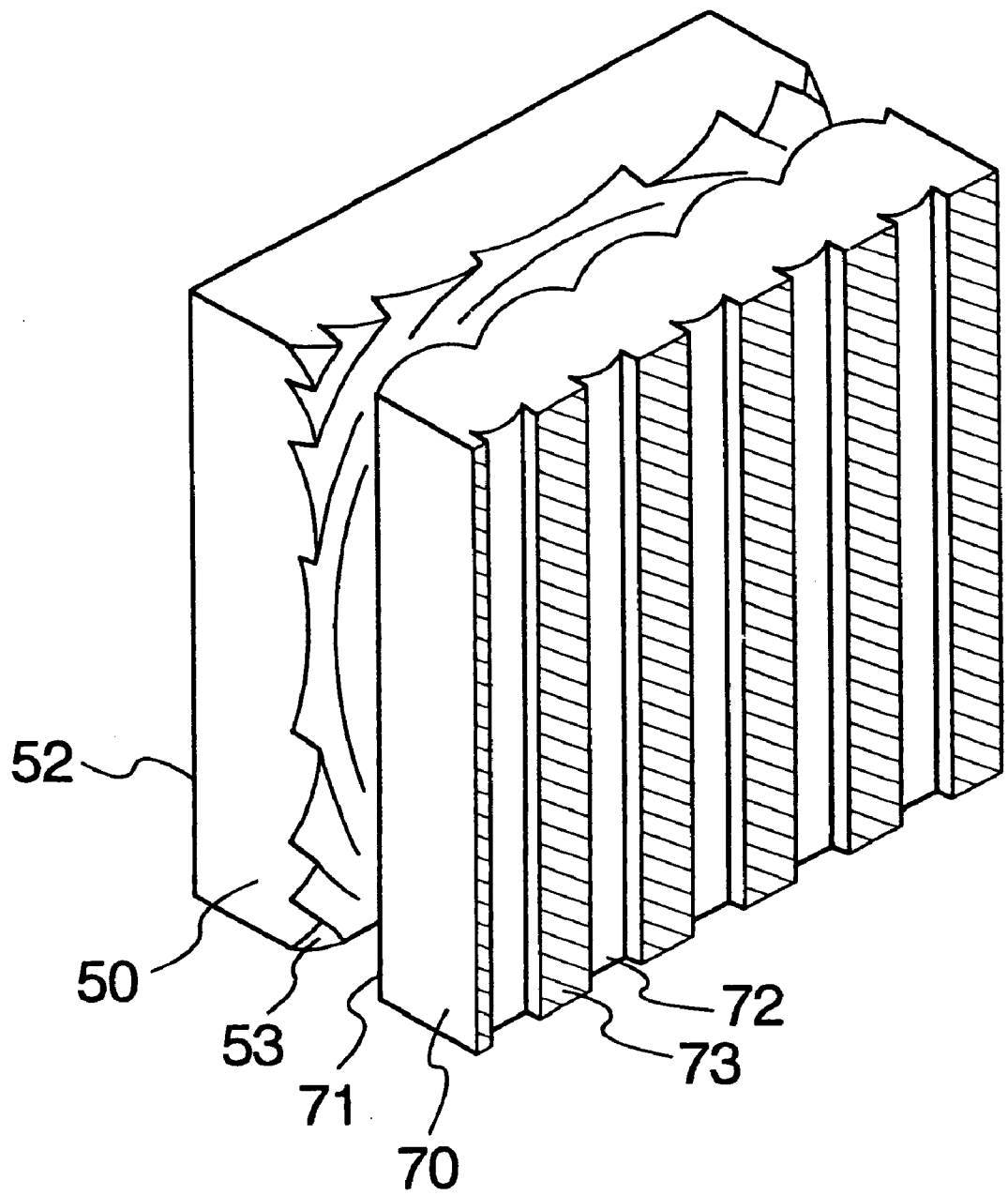
FIG. 32 is a perspective view illustrating a transmission screen used in a conventional rear projection-type display device.
Figure 33:
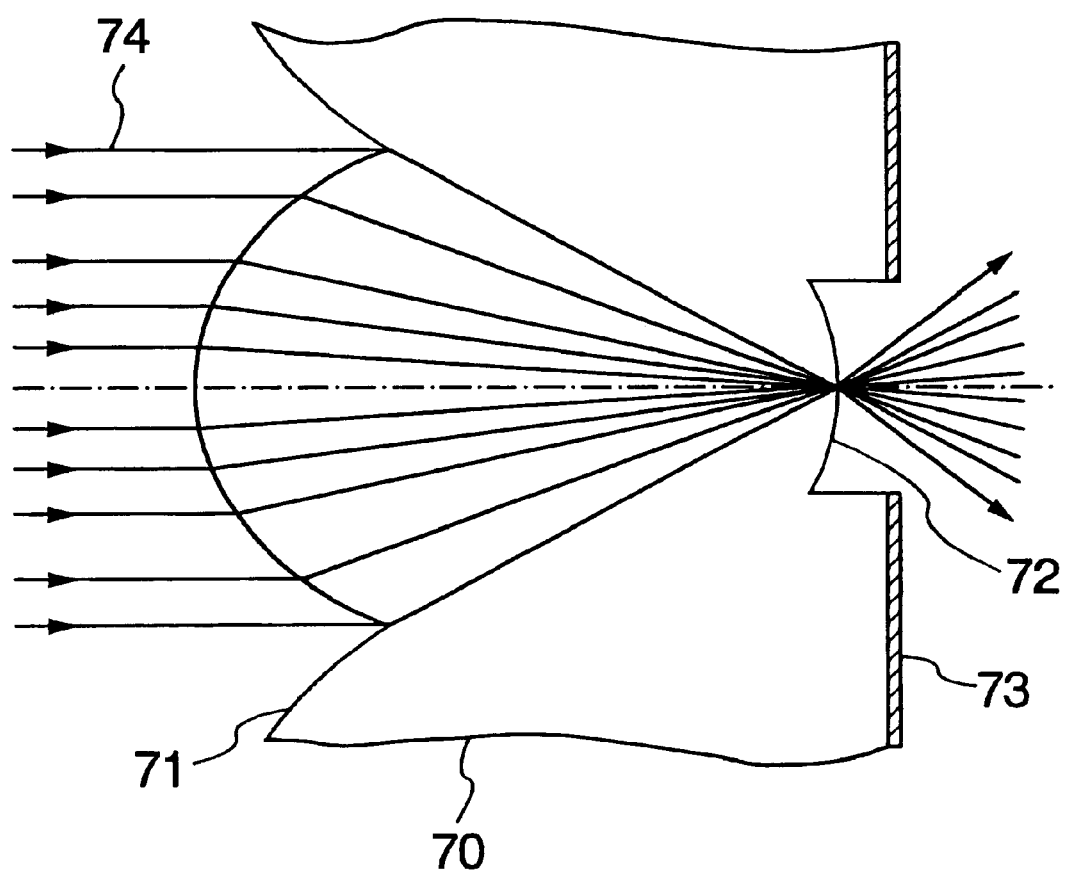
FIG. 33 is a horizontal cross-sectional view illustrating a lenticular lens sheet of a transmission screen used in a conventional rear projection-type display device.
Figure 34:
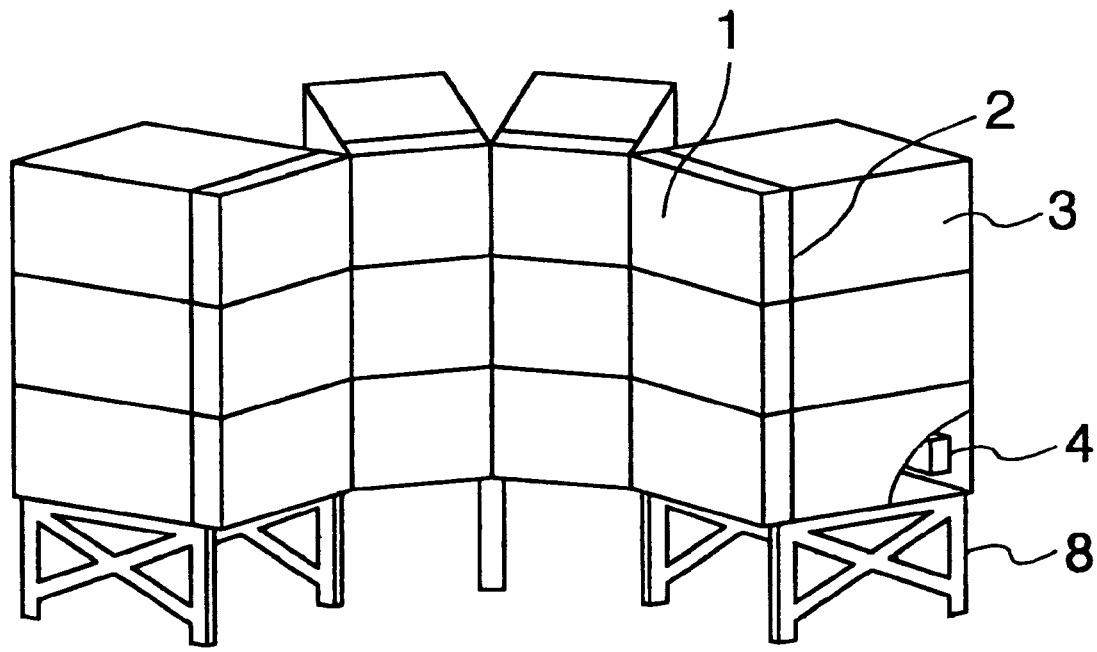
FIG. 34 is a perspective view illustrating a conventional rear projection-type multi-screen display apparatus.
Figure 35:
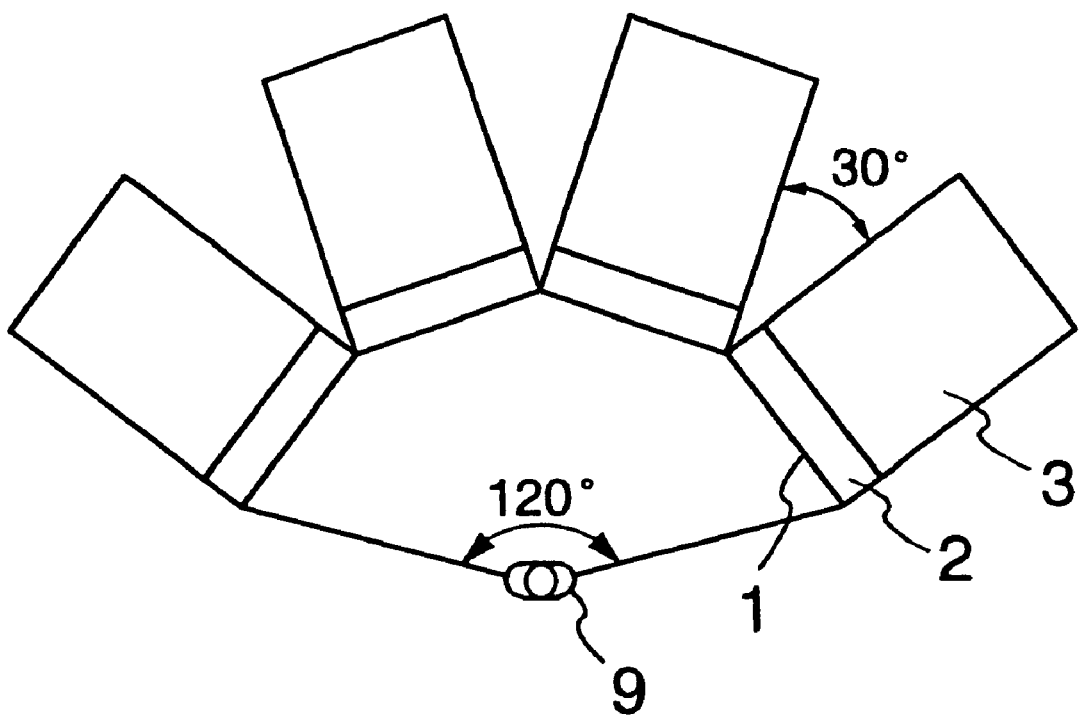
FIG. 35 is a horizontal cross-sectional view illustrating the conventional rear projection-type multi-screen display apparatus.
Figure 36:
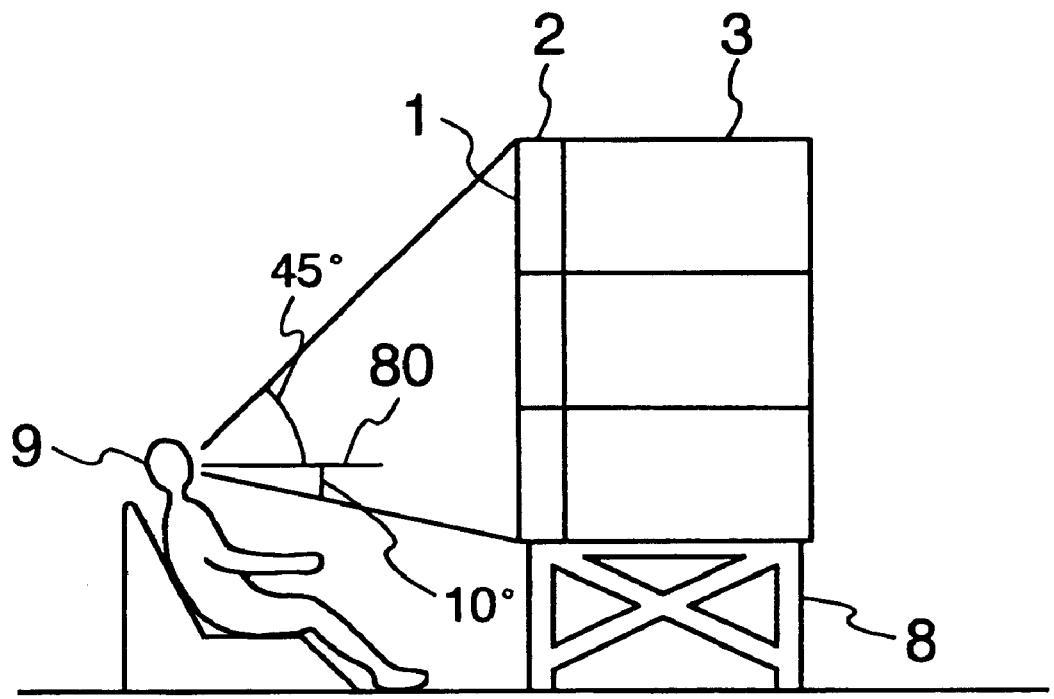
FIG. 36 is a vertical cross-sectional view illustrating the conventional rear projection-type multi-screen display apparatus.
Figure 37:
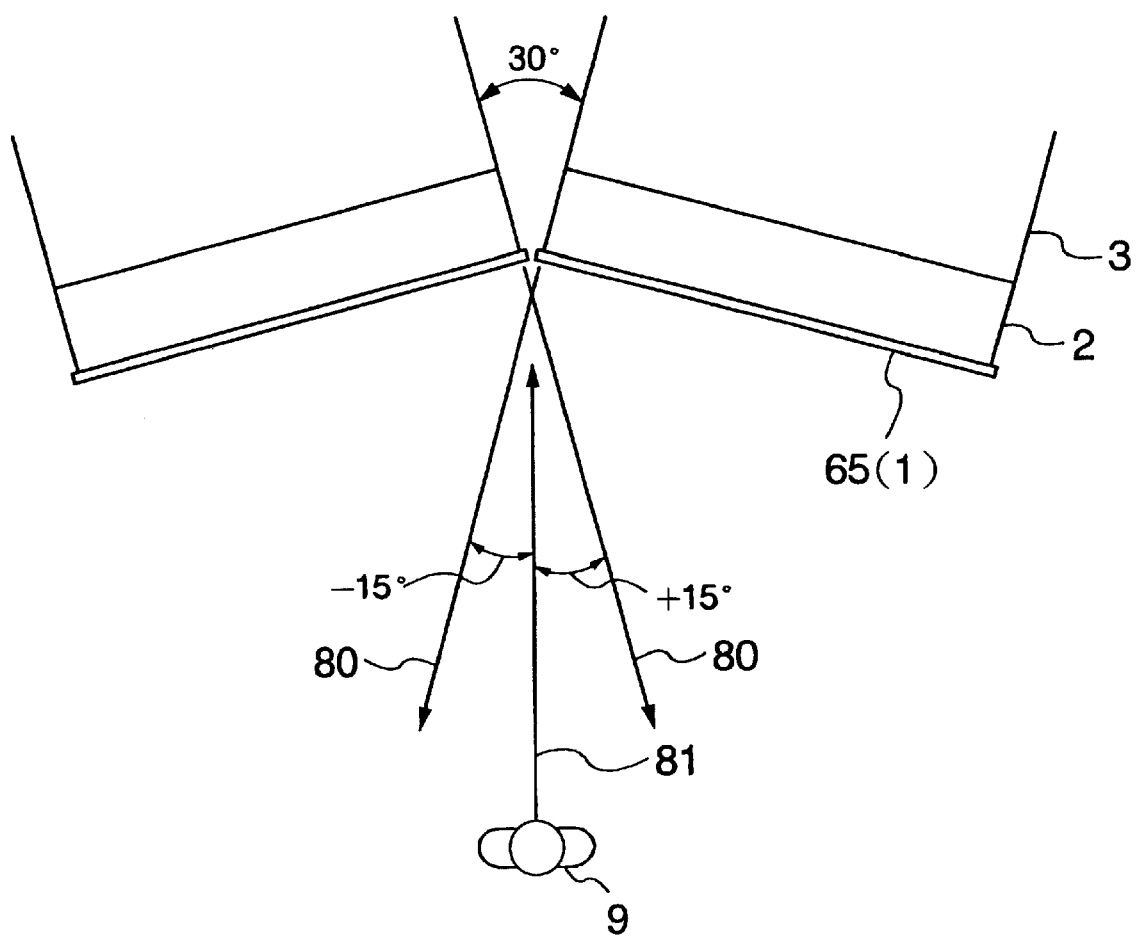
FIG. 37 is an enlarged view showing a joint portion of a screen in the conventional rear projection-type multi-screen display apparatus.
Figure 38:
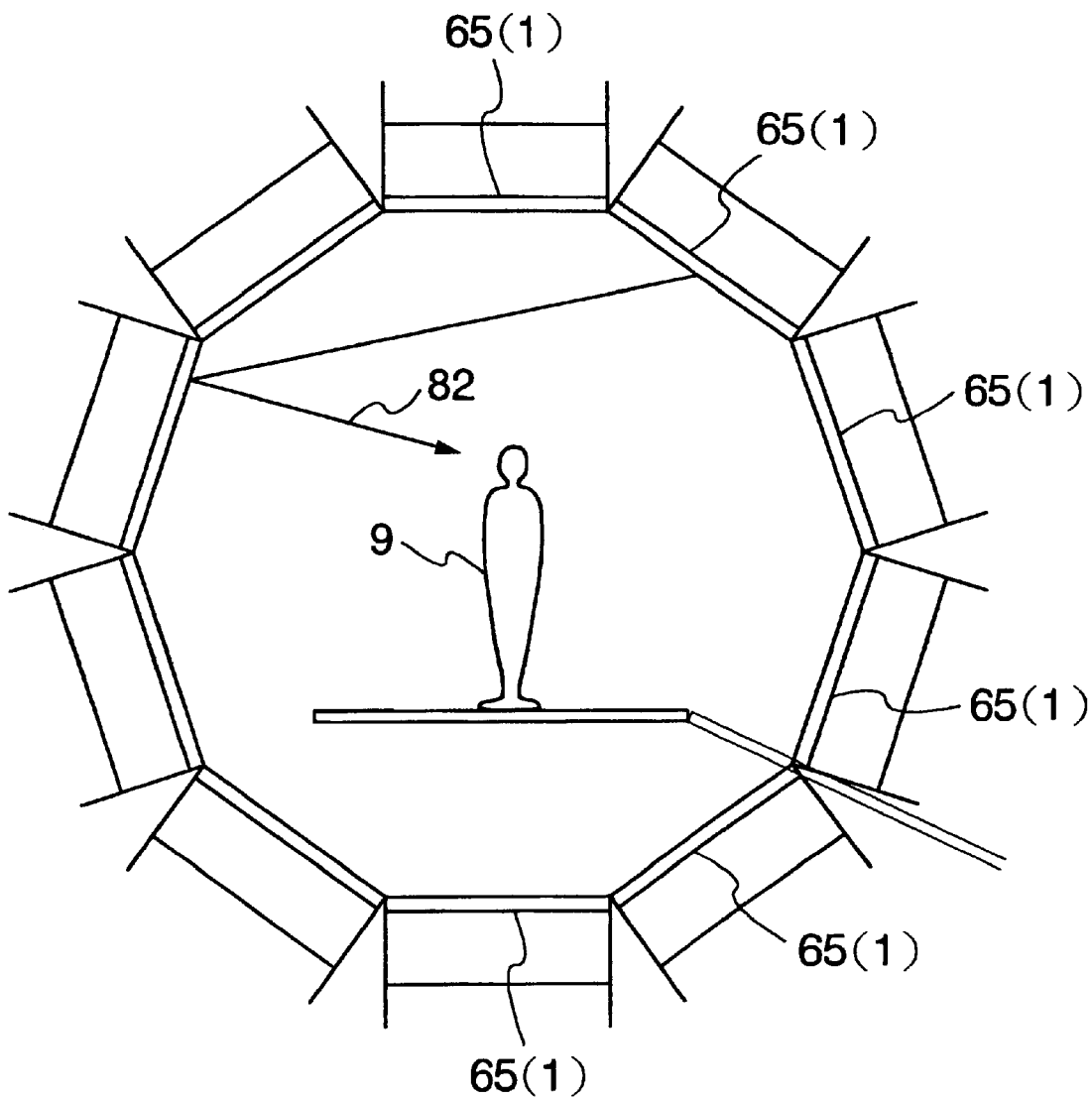
FIG. 38 is a vertical cross-sectional view illustrating a conventional rear projection-type multi-screen display apparatus having a curved overall screen, showing surface reflection on the transmission screen.

FIG. 28 is a partly-broken, perspective view which shows an important portion of the 12th embodiment of a display system of the invention, and FIG. 29 is a vertical cross-sectional view which shows the display system shown in FIG. 28. For better understanding of a screen structure of a rear projection-type multi-screen display apparatus of the system of this embodiment, the projection devices, screen support structures and so on are omitted from these figures.

As shown in FIGS. 28 and 29, in the display system of this embodiment, a simulation vehicle device 100 is provided in a display apparatus (rear projection-type multi-screen display apparatus) of a hanging bell-shape at a generally central portion thereof.

In the rear projection-type multi-screen display apparatus of this embodiment, screens 1 in first and second rows from the bottom have a rectangular shape, and screens 11, 12 and 13 in first, second and third rows from the top have a trapezoidal shape having its bottom side which are longer than its top side, the higher the row of the screens, the shorter the top side. Therefore, the overall screen has a hanging bell-like shape.

The rear projection-type multi-screen display apparatus of this embodiment can display a picture image extending 360° in a horizontal direction over an entire circumference, and therefore can provide a wider visibility angle, and can provide the enhanced realism. Besides, with this multi-screen construction, sufficient brightness and fineness can be achieved, and therefore the display system can provide the picture image which achieves the enhanced realism.

Although the preferred embodiments of present invention has been described above, it will be clear to those skilled in the art that various modifications can be made without departing from the scope of the invention. For example, as the image source used in the rear projection-type display device, any other suitable device than the CRT, such as a device using a liquid crystal element, can be used.

As is clear from the foregoing description, in the present invention, there are provided the rear projection-type multi-screen display apparatuses which can provide the picture image which achieves the wide visibility angle while achieving sufficient brightness and fineness, and provides the enhanced realism. The display apparatus of the invention can be assembled easily, and has a firm or rigid construction, and can provide the picture image less degraded in color change and contrast. Therefore, in the present invention, there is provided the display system which can provide the viewer with the enhanced realism.

What is claimed is:

1. A rear projection-type multi-display apparatus comprising:

a plurality of rear projection-type display devices each in which projection light from image sources is projected through projection lenses onto a rear projection surface of a rear projection screen to form a picture image on the rear projection screen, said plurality of rear projection-type display devices being combined together in contiguous relation to one another to form a large screen, said large screen having a viewing side remote from said rear projection surface of the rear projection screens of said plurality of rear projection-type display devices;

wherein the rear projection screens have peripheral edge parts at the viewing side of said the large screen which are against and fixed respectively to screen support frames of unit support frames so that for removal of the rear projection screens, the rear projection screens are pushed into the rear projection-type display devices, and said large screen has a portion which is formed into a concave surface curved both in a horizontal visibility angle direction and a vertical visibility angle direction.

2. Apparatus according to claim 1, in which at least part of said rear projection screen-type devices constituting said large screen have substantially flat screens.

3. Apparatus according to claim 1, in which at least part of said large screen has a polygonal shape other than a rectangular shape.

4. Apparatus according to claim 3, in which at least one of said screens having said polygonal shape other than a rectangular shape has a trapezoidal shape.

5. Apparatus according to claim 3, in which at least one of said plurality of rear projection-type display devices jointly constituting said viewing front surface of said large screen has a rectangular shape, and said screen of at least one of the other rear projection-type display devices has a trapezoidal shape.

6. Apparatus according to claim 1, wherein the rear projection screens are configured so that the projection light projected through the projection lenses and passing through a respective one of the rear projection screens is substantially prevented from being incident as external light upon another one of the rear projection screens so as to substantially prevent degradation of picture quality.

7. Apparatus according to claim 1, in which said large screen has a generally spherical shape.

8. Apparatus according to claim 7, in which said large screen has a shape defined by one of the whole and part of a generally regular dodecahedral surface.

9. Apparatus according to claim 7, in which said large screen has a shape defined by one of the whole and part of a generally regular icosahedral surface and a regular icosahedral surface.

10. Apparatus according to claim 7, in which said large screen has a shape defined by one part of a 32-surface construction having regular pentagonal surfaces and regular hexagonal surfaces.

11. Apparatus according to claim 7, in which each of said rear projection screens jointly constituting said large screen has a geodesic regular pentagonal shape on said front viewing surface of said large screen, and said large screen is defined by one of the whole and part of a pseudo dodecaheral surface analogous to a spherical surface, or one of the whole and part of a spherical surface.

12. Apparatus according to claim 7, in which each of said rear projection screens constituting viewing surface of said large screen has a geodesic regular triangular shape on said large screen, and said front viewing surface of said large screen is defined by one of the whole and part of a pseudo icosahedral surface analogous to a spherical surface, or one of the whole and part of a spherical surface.

13. Apparatus according to claim 7, in which part of said rear projection screens constituting said large screen has a geodesic regular pentagonal shape, and the other rear projection screens have a geodesic regular hexagonal shape said large screen, and said viewing front surface of said large screen is defined by one of the whole and part of a pseudo 32-surface construction analogous to a spherical surface, or one of the whole and part of a spherical surface, said 32-surface construction being defined by said geodesic regular pentagonal and hexagonal shapes in combination.

14. Apparatus according to claim 1, in which said large screen has a generally ellipsoidal shape.

15. Apparatus according to claim 1, in which said large screen has a shape generally equal to a shape generated by revolving a constant curved line about an axis.

16. Apparatus according to claim 1, claim 7, claim 14 or claim 15, in which each of said rear projection screens constituting said large screen has a geodesic polygonal surface, with each side of said polygonal shape disposed on a geodesic line on said large screen.

17. Apparatus according to claim 16, in which at least on of said geodesic polygonal shapes is a geodesic square shape analogous to a trapezoidal shape.

18. Apparatus according to claim 16, in which at least one rear projection screens of said constituting said large screen has a geodesic rectangular shape, and at least one of the other rear projection screens has a geodesic trapezoidal shape.

19. A rear projection-type multi-display apparatus comprising:

a plurality of rear projection-type display devices each in which projection light from image sources is projected through projection lenses onto a projection rear surface of a rear projection screen to form a picture image on said rear projection screen, the rear projection screens of said plurality of rear projection-type display devices being combined together in contiguous relation to one another to form a large screen, said large screen having a viewing side remote from said rear projection surface of the rear projection screens of said plurality of rear projection type display devices;

wherein the rear projection screens have peripheral edge parts at the viewing side of said large screen which are against and fixed respectively to screen support frames of unit support frames so that for removal of the rear projection screens, the rear projection screens are pushed into the rear projection type display devices, and said unit support frames are assembled together so that said large screen has a portion which is formed into a concave surface curved both in a horizontal visibility angle direction and a vertical visibility angle direction, so that when viewed from the front side, a visual field angle in the horizontal direction, as well as a visual field angle in the vertical direction, is not less than about 60°.

20. Apparatus according to claim 19, in which one of a viewing stand and a passage formed of a generally transparent material is provided at a lower portion of a viewing position.

21. Apparatus according to claim 20, in which said viewing stand or said passage has a width in the range of between 0.5 m and 2 m.

22. Apparatus according to claim 19, wherein the rear projection screens are configured so that the projection light projected through the projection lenses and passing through a respective one of the rear projection screens is substantially prevented from being incident as external light upon another one of the rear projection screens so as to substantially prevent degradation of picture quality.

23. A display system comprising a rear-projection multi-display apparatus according to claim 1 or claim 19.

* * * * *